United States Patent
Yamamoto

(10) Patent No.: US 11,981,398 B2
(45) Date of Patent: May 14, 2024

(54) BICYCLE DERAILLEUR

(71) Applicant: SHIMANO INC., Sakai (JP)

(72) Inventor: Shunsuke Yamamoto, Sakai (JP)

(73) Assignee: SHIMANO INC., Sakai (JP)

( * ) Notice: Subject to any disclaimer, the term of this patent is extended or adjusted under 35 U.S.C. 154(b) by 453 days.

(21) Appl. No.: 17/110,250

(22) Filed: Dec. 2, 2020

(65) Prior Publication Data
US 2022/0081067 A1 Mar. 17, 2022

Related U.S. Application Data

(63) Continuation-in-part of application No. 17/017,690, filed on Sep. 11, 2020, now abandoned.

(51) Int. Cl.
*B62M 9/122* (2010.01)

(52) U.S. Cl.
CPC ................... *B62M 9/122* (2013.01)

(58) Field of Classification Search
CPC ...... B62M 9/122; B62M 25/08; B62M 9/132; B62M 9/128; B62J 11/19
USPC ...................................... 474/80, 82
See application file for complete search history.

(56) References Cited

U.S. PATENT DOCUMENTS

| | | | |
|---|---|---|---|
| 5,624,334 A | 4/1997 | Lumpkin | |
| 5,816,966 A | 10/1998 | Yang et al. | |
| 6,162,140 A * | 12/2000 | Fukuda | B62M 25/08 474/81 |
| 6,287,228 B1 | 9/2001 | Ichida | |
| 6,419,602 B1 | 7/2002 | Soon | |
| 6,623,389 B1 * | 9/2003 | Campagnolo | B62M 25/08 474/70 |
| 6,659,895 B2 * | 12/2003 | Fukuda | B62M 9/128 324/168 |
| 6,857,975 B2 * | 2/2005 | Kitamura | B62M 25/08 474/70 |
| 6,945,888 B2 * | 9/2005 | Fukuda | B62J 45/41 474/70 |
| 6,997,835 B2 * | 2/2006 | Fukuda | B62M 9/1242 474/82 |
| 7,207,914 B2 | 4/2007 | Chamberlain et al. | |
| 7,290,458 B2 * | 11/2007 | Fukuda | B62M 25/08 74/82 |
| 7,320,655 B2 * | 1/2008 | Fukuda | B62M 9/1242 474/70 |
| 7,442,136 B2 * | 10/2008 | Ichida | B62M 9/132 474/82 |
| 7,467,567 B2 * | 12/2008 | Fukuda | B62M 9/1244 474/82 |
| 7,704,173 B2 * | 4/2010 | Ichida | B62M 9/132 474/82 |
| 7,892,122 B2 * | 2/2011 | Fukuda | B62M 9/122 474/82 |

(Continued)

FOREIGN PATENT DOCUMENTS

| | | |
|---|---|---|
| CN | 205034288 U | 2/2016 |
| CN | 108482573 | 9/2018 |

(Continued)

*Primary Examiner* — Henry Y Liu
(74) *Attorney, Agent, or Firm* — MORI & WARD, LLP

(57) ABSTRACT

A bicycle derailleur comprises a derailleur body and a cable holder. The derailleur body is configured to be attached to a bicycle frame. The cable holder is configured to hold an electric cable.

26 Claims, 32 Drawing Sheets

(56) References Cited

U.S. PATENT DOCUMENTS

| | | | |
|---|---|---|---|
| 7,942,768 B2* | 5/2011 | Takamoto | B62M 9/122 474/82 |
| 7,980,974 B2* | 7/2011 | Fukuda | B62M 9/122 474/70 |
| 8,025,597 B2* | 9/2011 | Takamoto | B62M 25/08 474/70 |
| 8,066,597 B2* | 11/2011 | Sakaue | B62M 9/122 474/82 |
| 8,137,223 B2* | 3/2012 | Watarai | B62K 23/06 474/81 |
| 8,202,182 B2* | 6/2012 | Ishikawa | B62M 9/1348 474/82 |
| 8,241,158 B2* | 8/2012 | Ishikawa | B62M 9/132 474/82 |
| 8,979,683 B2* | 3/2015 | Katsura | B62M 25/08 474/82 |
| 9,008,923 B2* | 4/2015 | Takamoto | F16H 61/0202 474/155 |
| 9,676,446 B2* | 6/2017 | Pasqua | B62M 9/132 |
| 10,053,189 B2* | 8/2018 | Pasqua | B62M 9/132 |
| 10,239,579 B2* | 3/2019 | Pasqua | B62M 9/122 |
| 10,370,060 B2* | 8/2019 | Komatsu | B62K 19/36 |
| 2005/0215369 A1* | 9/2005 | Fukuda | B62M 25/08 474/70 |
| 2005/0239587 A1* | 10/2005 | Ichida | B62M 9/122 474/82 |
| 2006/0183584 A1* | 8/2006 | Fukuda | B62M 25/08 474/70 |
| 2007/0191159 A1* | 8/2007 | Fukuda | B62M 9/1242 474/70 |
| 2008/0227572 A1* | 9/2008 | Sakaue | B62M 9/122 474/82 |
| 2009/0098963 A1* | 4/2009 | Watarai | B62K 23/06 474/80 |
| 2009/0209375 A1* | 8/2009 | Takamoto | B62M 25/08 474/18 |
| 2009/0215561 A1* | 8/2009 | Fukuda | B62M 9/122 474/82 |
| 2009/0261652 A1* | 10/2009 | Nakayama | B62K 23/06 307/9.1 |
| 2012/0322591 A1* | 12/2012 | Kitamura | B62M 9/122 474/80 |
| 2013/0192405 A1* | 8/2013 | Katsura | B62M 9/105 74/473.12 |
| 2014/0087901 A1* | 3/2014 | Shipman | B62M 9/1242 429/100 |
| 2014/0128189 A1* | 5/2014 | Kuwayama | B62M 9/132 474/82 |
| 2014/0128190 A1* | 5/2014 | Emura | F16H 63/3013 474/82 |
| 2014/0243128 A1* | 8/2014 | Pasqua | B62M 9/132 474/80 |
| 2014/0287856 A1* | 9/2014 | Kuwayama | B62M 9/132 474/80 |
| 2014/0296009 A1* | 10/2014 | Suyama | B62M 9/122 474/80 |
| 2016/0152301 A1* | 6/2016 | Bortoli | B62M 9/132 474/82 |
| 2017/0101155 A1 | 4/2017 | Tachibana et al. | |
| 2017/0113759 A1 | 4/2017 | Watarai et al. | |
| 2017/0120983 A1* | 5/2017 | Komatsu | B62K 25/30 |
| 2018/0237104 A1 | 8/2018 | Pasqua et al. | |
| 2019/0193802 A1* | 6/2019 | Hara | G08C 17/00 |

FOREIGN PATENT DOCUMENTS

| | | |
|---|---|---|
| DE | 10 2013 001 139 | 8/2013 |
| DE | 10 2016 002 298 | 9/2016 |
| JP | 3373195 | 6/2001 |
| JP | 2007-196698 | 8/2007 |

* cited by examiner

BICYCLE DERAILLEUR

CROSS-REFERENCE TO RELATED APPLICATIONS

The present application is a continuation-in-part application of the U.S. patent application Ser. No. 17/017,690 filed Sep. 11, 2020. The contents of this application are incorporated herein by reference in their entirety.

BACKGROUND OF THE INVENTION

Field of the Invention

The present invention relates to a bicycle derailleur.

Discussion of the Background

A bicycle includes a derailleur configured to move a chain relative to a plurality of sprockets.

SUMMARY OF THE INVENTION

In accordance with a first aspect of the present invention, a bicycle derailleur comprises a derailleur body and a cable holder. The derailleur body is configured to be attached to a bicycle frame. The cable holder is configured to hold an electric cable.

With the bicycle derailleur according to the first aspect, it is possible to hold the electric cable using the cable holder, stabilizing the posture of the electric cable relative to the derailleur body and the bicycle frame. Thus, it is possible to reduce interference between the electric cable and other things such as the derailleur body, the bicycle fame, and a chain.

In accordance with a second aspect of the present invention, the bicycle derailleur according to the first aspect is configured so that the derailleur body including an outward side and an inward side provided on a reverse side of the outward side. The inward side is provided closer to a transverse center plane of the bicycle frame than the outward side in a mounting state where the derailleur body is mounted to the bicycle frame. The cable holder is configured to be attached to the inward side.

With the bicycle derailleur according to the second aspect, it is possible to reduce interference between the cable holder and other things other than a bicycle including the bicycle derailleur.

In accordance with a third aspect of the present invention, the bicycle derailleur according to the first or second aspect is configured so that the derailleur body includes a base member and a base fastener configured to be attached to the base member. The base fastener includes a longitudinal axis, a first end, and a second end. The base fastener extends between the first end and the second end along the longitudinal axis. The second end of the base fastener is provided closer to a transverse center plane of the bicycle frame than the first end of the base fastener in a mounting state where the derailleur body is mounted to the bicycle frame. The cable holder is configured to be attached to the second end of the base fastener.

With the bicycle derailleur according to the third aspect, it is possible to attach the cable holder to the derailleur body using the base fastener. Furthermore, it is possible to reduce interference between the cable holder and other things other than a bicycle including the bicycle derailleur.

In accordance with a fourth aspect of the present invention, a bicycle derailleur comprises a derailleur body and a cable holder. The derailleur body includes a base member and a base fastener configured to be attached to the base member. The cable holder is configured to be attached to the base fastener to hold a cable.

With the bicycle derailleur according to the fourth aspect, it is possible to attach the cable holder to the derailleur body using the base fastener.

In accordance with a fifth aspect of the present invention, the bicycle derailleur according to the fourth aspect is configured so that the base fastener includes a longitudinal axis, a first end, and a second end. The base fastener extends between the first end and the second end along the longitudinal axis. The second end of the base fastener is provided closer to the transverse center plane of the bicycle frame than the first end of the base fastener in the mounting state where the derailleur body is mounted to the bicycle frame. The cable holder is configured to be attached to at least one of the first end and the second end of the base fastener to hold the cable.

With the bicycle derailleur according to the fifth aspect, it is possible to reduce interference between the cable holder and other things other than a bicycle including the bicycle derailleur.

In accordance with a sixth aspect of the present invention, the bicycle derailleur according to any one of the first to fifth aspects is configured so that the cable holder is configured to be movably coupled to the derailleur body.

With the bicycle derailleur according to the sixth aspect, it is possible to adjust the posture of the cable holder relative to the derailleur body.

In accordance with a seventh aspect of the present invention, the bicycle derailleur according to any one of the first to sixth aspects is configured so that the cable holder is configured to be pivotally coupled to the derailleur body.

With the bicycle derailleur according to the seventh aspect, it is possible to adjust the posture of the cable holder relative to the derailleur body.

In accordance with an eighth aspect of the present invention, the bicycle derailleur according to any one of the first to seventh aspects is configured so that the cable holder is configured to restrict the electric cable from moving relative to the derailleur body in a first direction defined along the longitudinal axis of the base fastener.

With the bicycle derailleur according to the eighth aspect, it is possible to stabilize the posture of the electric cable relative to the derailleur body in the first direction.

In accordance with a ninth aspect of the present invention, the bicycle derailleur according to any one of the first to seventh aspects is configured so that the cable holder is configured to restrict the electric cable from moving relative to the derailleur body in a second direction different from the first direction.

With the bicycle derailleur according to the ninth aspect, it is possible to stabilize the posture of the electric cable relative to the derailleur body in the first direction and the second direction.

In accordance with a tenth aspect of the present invention, the bicycle derailleur according to any one of the third and fifth to ninth aspects is configured so that the base fastener includes an attachment hole provided at the second end of the base fastener. The cable holder is configured to be at least partly provided in the attachment hole.

With the bicycle derailleur according to the tenth aspect, it is possible to attach the cable holder to the base fastener with a simple structure such at the attachment hole.

In accordance with an eleventh aspect of the present invention, the bicycle derailleur according to the tenth aspect is configured so that the cable holder includes a holder body and an attachment protrusion. The holder body is configured to be contactable with the electric cable. The attachment protrusion extends from the holder body. The attachment protrusion is configured to be at least partly provided in the attachment hole.

With the bicycle derailleur according to the eleventh aspect, it is possible to attach the cable holder to the base fastener with a simple structure such at the attachment hole and the attachment protrusion.

In accordance with a twelfth aspect of the present invention, the bicycle derailleur according to the tenth or eleventh aspect is configured so that the base fastener includes a tool engagement hole provided at the first end to be engaged with a tool.

With the bicycle derailleur according to the twelfth aspect, it is possible to tighten or release the base fastener using the tool engagement hole.

In accordance with a thirteenth aspect of the present invention, the bicycle derailleur according to the twelfth aspect is configured so that the attachment hole is connected to the tool engagement hole.

With the bicycle derailleur according to the thirteenth aspect, it is possible to easily form the attachment hole.

In accordance with a fourteenth aspect of the present invention, the bicycle derailleur according to any one of the eleventh to thirteenth aspects is configured so that the holder body is configured to hold the electric cable between the holder body and the base member.

With the bicycle derailleur according to the fourteenth aspect, it is possible to stabilize the posture of the electric cable relative to the derailleur body using the holder body.

In accordance with a fifteenth aspect of the present invention, the bicycle derailleur according to any one of the eleventh to fourteenth aspects is configured so that the holder body includes a first holder body and a second holder body. The first holder body is coupled to the attachment protrusion. The second holder body extends from the first holder body, the second holder body being spaced apart from the attachment protrusion.

With the bicycle derailleur according to the fifteenth aspect, it is possible to reliably stabilize the posture of the electric cable relative to the derailleur body using the holder body.

In accordance with a sixteenth aspect of the present invention, the bicycle derailleur according to the fifteenth aspect is configured so that the first holder body includes a first support surface. The attachment protrusion extends from the first support surface. The second holder body includes a second support surface configured to face toward the attachment protrusion.

With the bicycle derailleur according to the sixteenth aspect, it is possible to reliably stabilize the posture of the electric cable relative to the derailleur body using the first support surface and the second support surface.

In accordance with a seventeenth aspect of the present invention, the bicycle derailleur according to the sixteenth aspect is configured so that the second support surface is configured to face toward the base member in an attachment state where the cable holder is attached to the base fastener and the base fastener is attached to the base member.

With the bicycle derailleur according to the seventeenth aspect, it is possible to more reliably stabilize the posture of the electric cable relative to the derailleur body using the first support surface and the second support surface.

In accordance with an eighteenth aspect of the present invention, the bicycle derailleur according to any one of the eleventh to thirteenth aspects is configured so that the holder body includes a holder groove in which the electric cable is to be provided.

With the bicycle derailleur according to the eighteenth aspect, it is possible to reliably hold the electric cable using the holder groove.

In accordance with a nineteenth aspect of the present invention, the bicycle derailleur according to the eighteenth aspect is configured so that the holder body includes a first holder body and a second holder body. The first holder body is coupled to the attachment protrusion. The second holder body extends from the first holder body. The second holder body is spaced apart from the attachment protrusion. The second holder body includes the holder groove.

With the bicycle derailleur according to the nineteenth aspect, it is possible to reliably hold the electric cable using the holder groove.

In accordance with a twentieth aspect of the present invention, the bicycle derailleur according to the eighteenth or nineteenth aspect is configured so that the holder groove extends in a direction which is non-parallel to the longitudinal axis of the base fastener in an attachment state where the cable holder is attached to the base fastener and the base fastener is attached to the base member.

With the bicycle derailleur according to the twentieth aspect, it is possible to more reliably hold the electric cable using the holder groove.

In accordance with a twenty-first aspect of the present invention, the bicycle derailleur according to any one of the third to twentieth aspects is configured so that the base fastener is configured to fasten the base member to the bicycle frame.

With the bicycle derailleur according to the twenty-first aspect, it is possible to fasten the base member to the bicycle frame with a simple structure such as the base fastener.

In accordance with a twenty-second aspect of the present invention, the bicycle derailleur according to any one of the third to twenty-first aspects is configured so that the derailleur body includes a bracket configured to be secured to the bicycle frame. The base fastener is configured to fasten the base member to the bracket.

With the bicycle derailleur according to the twenty-second aspect, it is possible to improve the flexibility of arrangement of the derailleur body relative to the bicycle frame.

In accordance with a twenty-third aspect of the present invention, the bicycle derailleur according to any one of the twenty-third to twenty-first aspects is configured so that the derailleur body includes a bracket configured to be secured to the bicycle frame. The base fastener is configured to fasten the bracket to the bicycle frame.

With the bicycle derailleur according to the twenty-third aspect, it is possible to improve the flexibility of arrangement of the derailleur body relative to the bicycle frame.

In accordance with a twenty-fourth aspect of the present invention, the bicycle derailleur according to any one of the third and fifth to twenty-second aspects is configured so that the base fastener includes a fastener head and a fastener rod. The fastener head includes the first end. The fastener rod extends from the fastener head to the second end and including an external thread.

With the bicycle derailleur according to the twenty-fourth aspect, it is possible to simplify the structure of the base fastener.

In accordance with a twenty-fifth aspect of the present invention, an electric cable holder for a bicycle derailleur comprises a holder body and an attachment body. The holder body is configured to be contactable with an electric cable. The attachment body is configured to be attached to the bicycle derailleur.

With the bicycle derailleur according to the twenty-fifth aspect, it is possible to hold the electric cable using the cable holder, stabilizing the posture of the electric cable relative to the bicycle derailleur and the bicycle frame. Thus, it is possible to reduce interference between the electric cable and other things such as the derailleur body, the bicycle fame, and a chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
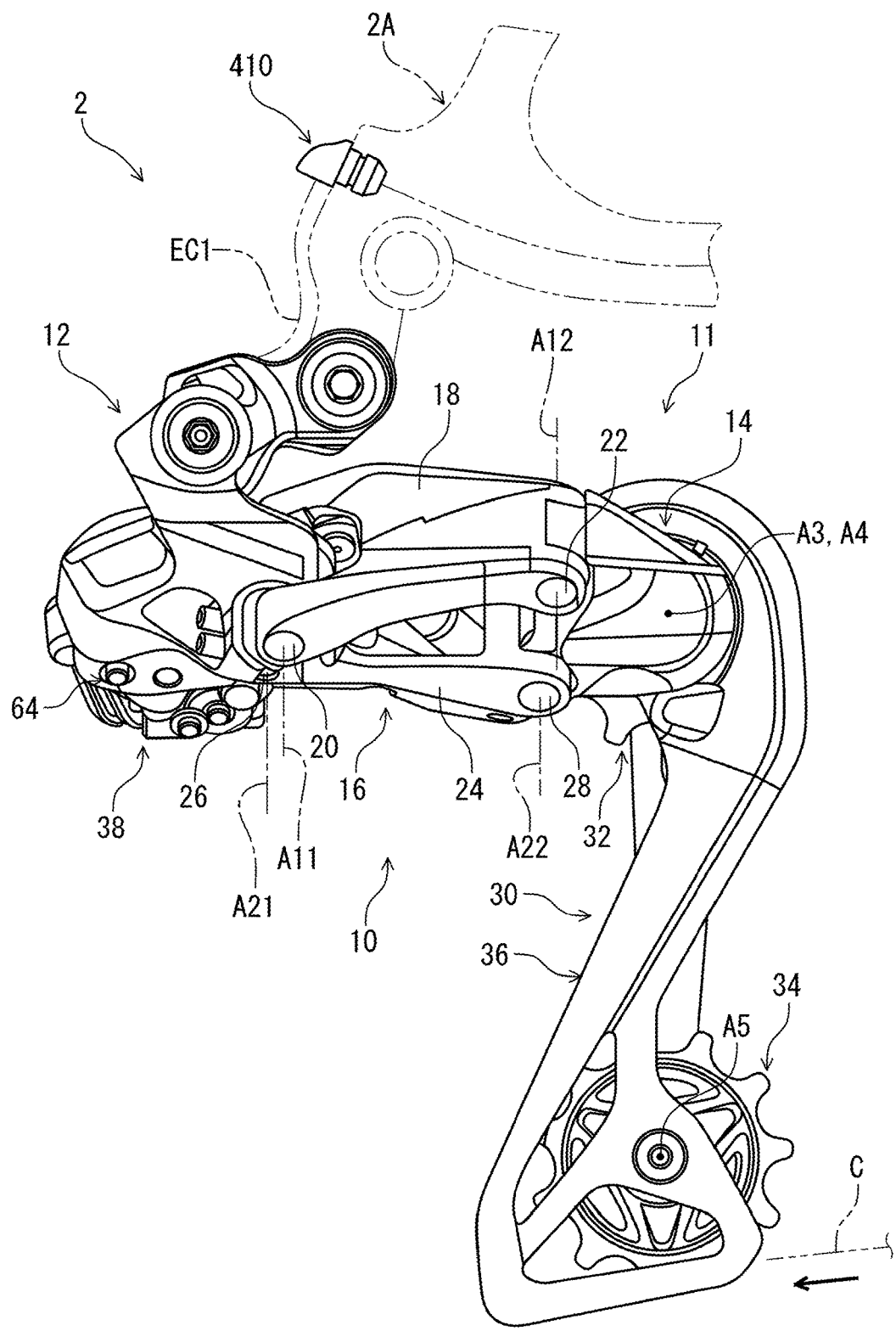
FIG. 1 is a side elevational view of a bicycle including a bicycle derailleur in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle derailleur 10 is configured to be mounted to a bicycle frame 2A of a bicycle 2. The bicycle 2 includes a mountain bike, a road bike, a city bike, a tricycle, a cargo bike, a recumbent bike, or any type of bicycles. In the present embodiment, the bicycle derailleur 10 is a rear derailleur. However, the structure of the bicycle derailleur 10 can apply to other derailleurs such as a front derailleur.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the bicycle with facing a handlebar. Accordingly, these terms, as utilized to describe the bicycle derailleur 10 or other components, should be interpreted relative to the bicycle 2 equipped with the bicycle derailleur 10 as used in an upright riding position on a horizontal surface.

The bicycle derailleur 10 comprises a derailleur body 11. The derailleur body 11 is configured to be attached to the bicycle frame 2A. The derailleur body 11 includes a base member 12. The derailleur body 11 includes a movable member 14. Namely, the bicycle derailleur 10 comprises the base member 12 and the movable member 14. The base member 12 is configured to be mounted to the bicycle frame 2A. The movable member 14 is configured to be movably coupled to the base member 12.

The derailleur body 11 includes a linkage structure 16. Namely, the bicycle derailleur 10 comprises the linkage structure 16. The linkage structure 16 is configured to movably couple the movable member 14 to the base member 12. The linkage structure 16 includes at least one linkage axis.

In the present embodiment, the linkage structure 16 includes a first link 18, a first link pin 20, a first additional link pin 22, a second link 24, a second link pin 26, and a second additional link pin 28. The first link 18 is pivotally coupled to the base member 12 about a first linkage axis A11 with the first link pin 20. The second link 24 is pivotally coupled to the base member 12 about a second linkage axis A21 with the second link pin 26. The first link 18 is pivotally coupled to the movable member 14 about a first additional linkage axis A12 with the first additional link pin 22. The second link 24 is pivotally coupled to the movable member 14 about a second additional linkage axis A22 with the second additional link pin 28.

Figure 2:
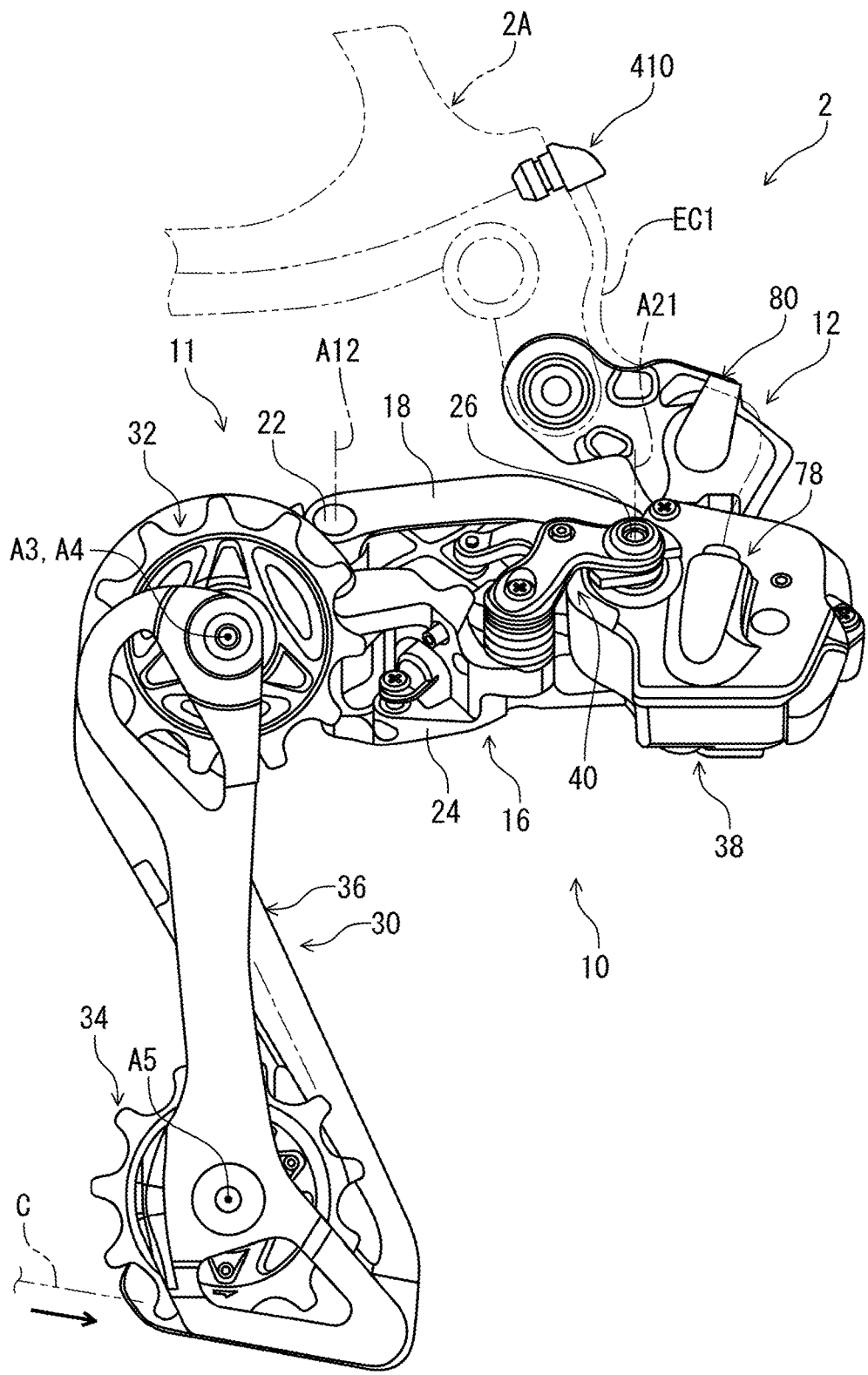
FIG. 2 is another side elevational view of the bicycle illustrated in FIG. 1.

As seen in FIG. 2, the derailleur body 11 includes a chain guide 30. Namely, the bicycle derailleur 10 comprises the chain guide 30. The chain guide 30 is pivotally disposed on the movable member 14. The chain guide 30 is pivotable relative to the movable member 14 about a chain-guide axis A3. The chain guide 30 includes a guide pulley 32, a tension pulley 34, and a guide member 36. The guide member 36 is pivotally coupled to the movable member 14 about the chain-guide axis A3. The guide pulley 32 is rotatably coupled to the guide member 36 about a guide pulley axis A4. The tension pulley 34 is rotatably coupled to the guide member 36 about a tension pulley axis A5. The guide pulley 32 and the tension pulley 34 are configured to be engaged with a chain C.

The derailleur body 11 includes a motor unit 38. Namely, the bicycle derailleur 10 further comprises the motor unit 38. The motor unit 38 is configured to be coupled to at least one of the movable member 14 and the linkage structure 16 to move the movable member 14 relative to the base member 12. In the present embodiment, the motor unit 38 is configured to be coupled to the second link 24 of the linkage structure 16 to move the movable member 14 relative to the base member 12. However, the motor unit 38 can be configured to be coupled to the movable member 14 or both the movable member 14 and the linkage structure 16 to move the movable member 14 relative to the base member 12.

The bicycle derailleur 10 comprises a saver structure 40 configured to protect the motor unit 38 from overload. The motor unit 38 is configured to be coupled to the second link 24 of the linkage structure 16 via the saver structure 40. The saver structure 40 has a transmission state and a non-transmission state. In the transmission state, the saver structure 40 is configured to transmit a drive force of the motor unit 38 to the linkage structure 16 to move the movable member 14 with respect to the base member 12. In the non-transmission state, the saver structure 40 is configured to cut off the transmission of the drive force from the motor unit 38 to the linkage structure 16. Since the saver structure 40 includes a structure which has been known in the bicycle field, it will not be described in detail here for the sake of brevity.

Figure 3:
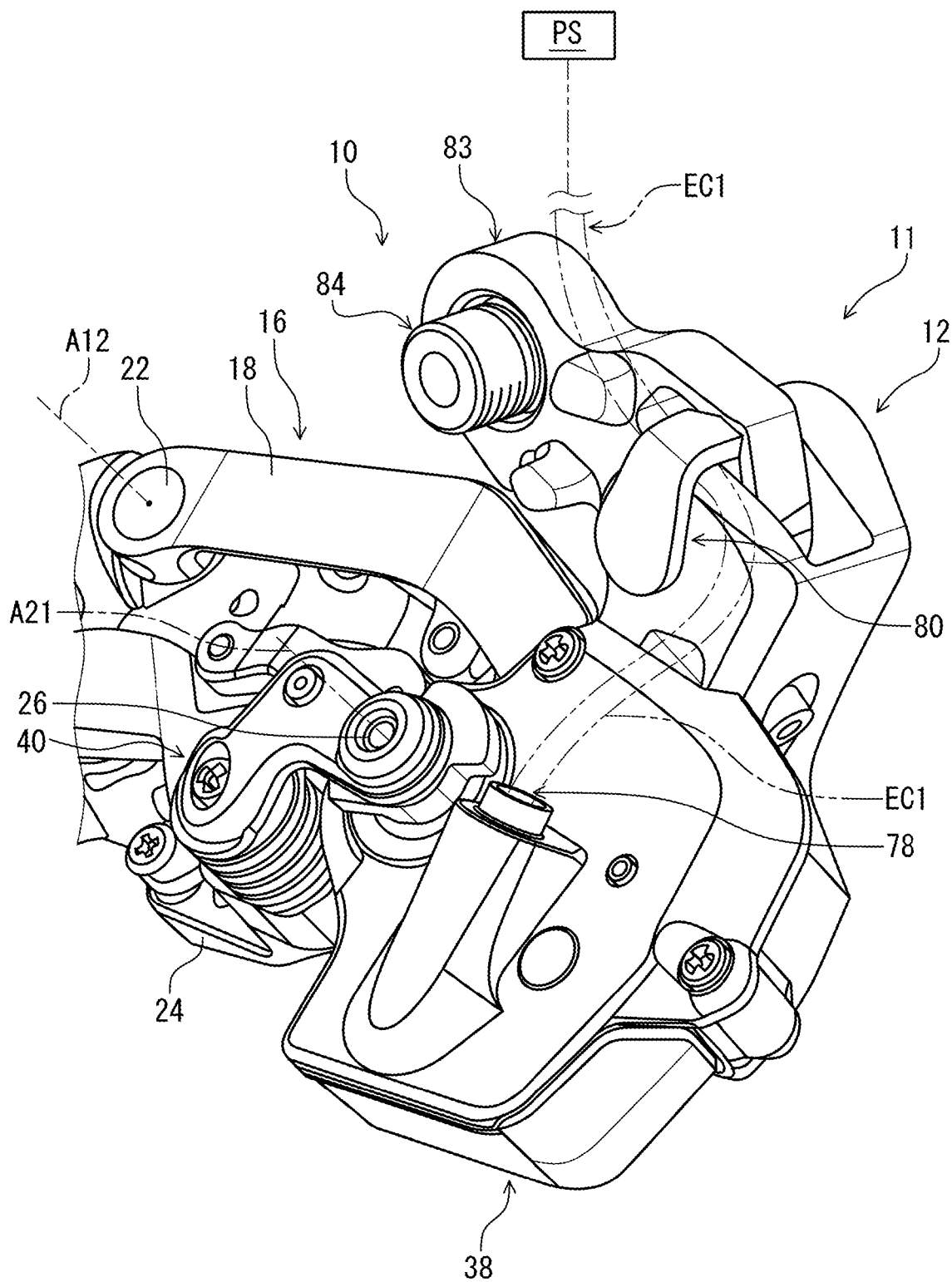
FIG. 3 is a perspective view of the bicycle derailleur illustrated in FIG. 1.

As seen in FIG. 3, the bicycle derailleur 10 further comprises an electric port 78. The electric port 78 is configured to be electrically connected to the motor unit 38 to supply electric power to the motor unit 38. The electric port 78 is configured to be electrically connected to an electric cable EC1. The electric port 78 is configured to receive electric power through the electric cable EC1. The electric port 78 is configured to transmit electric power through the electric cable EC1. The electric port 78 is configured to receive electric power from an external electric power source PS through the electric cable EC1. The electric port 78 is configured to transmit electric power to an external electric power source PS through the electric cable EC1 for charging the external electric power source PS. The external electric power source PS includes a secondary battery, for example. The electric port 78 may receive and send information related to bicycle derailleur 10 through the electric cable.

In the present embodiment, the electric port 78 is provided to the base member 12 and the motor unit 38. The electric port 78 includes a first hole 78A, a second hole 78B, and an electric connector 78C. The first hole 78A is provided to the base member 12. The second hole 78B is provided to the housing 42. The electric connector 78C is provided in the second hole 78B. The electric connector 78C is configured to be electrically connected to the circuit board 62.

The bicycle derailleur comprises a cable holder 80. The cable holder 80 is configured to hold the electric cable EC1. The cable holder 80 is configured to be detachably attached to the derailleur body 11. The cable holder 80 can also be referred to as an electric cable holder 80. The electric cable EC1 can also be referred to as a cable EC1 or a bicycle cable EC1.

Figure 4:
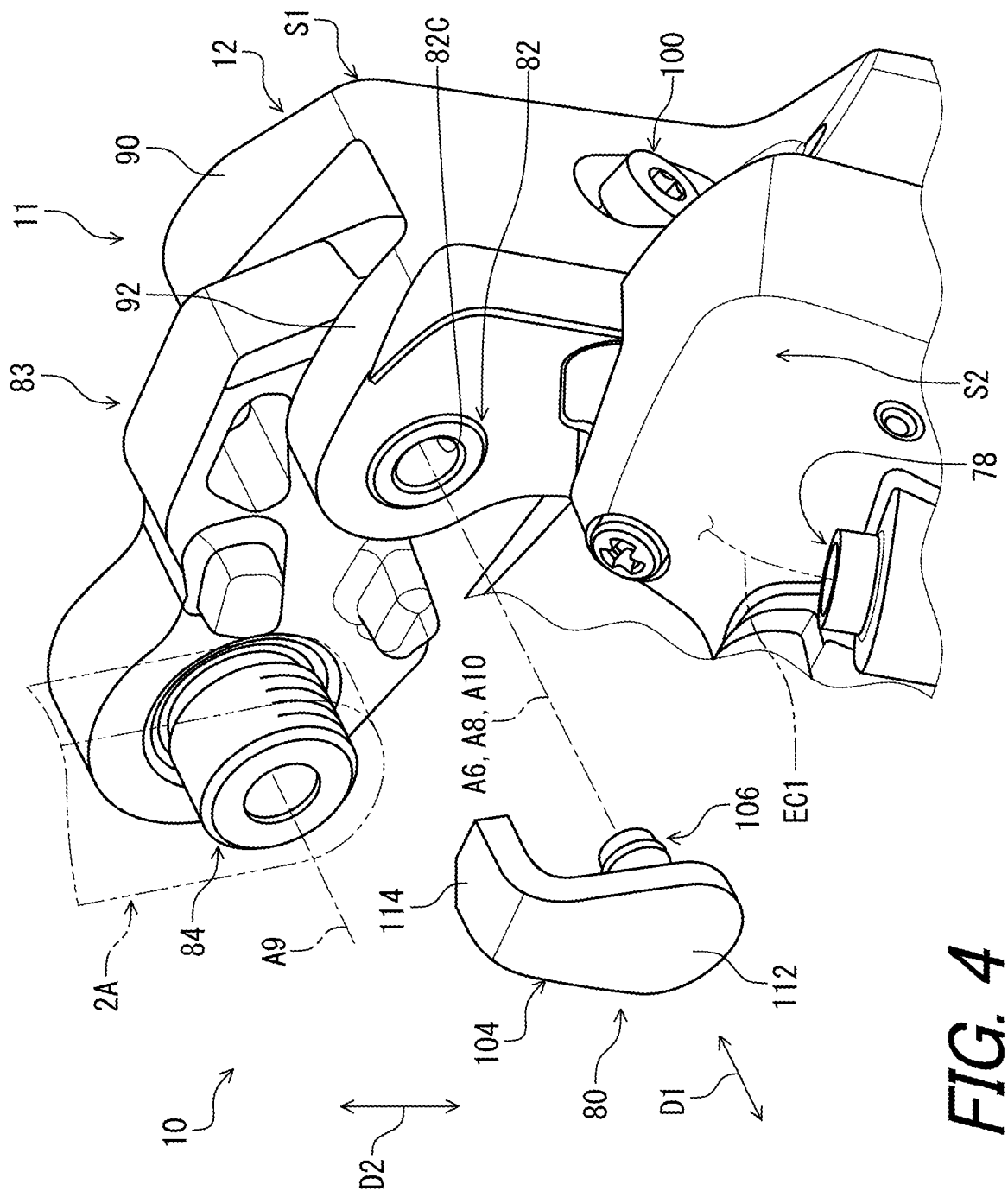
FIG. 4 is an exploded perspective view of the bicycle derailleur illustrated in FIG.

As seen in FIG. 4, the derailleur body 11 includes a base fastener 82 configured to be attached to the base member 12. The base fastener 82 is configured to fasten the base member 12 to the bicycle frame 2A. The derailleur body 11 includes a bracket 83 configured to be secured to the bicycle frame 2A. The bracket 83 is a separate member from the base member 12. The base fastener 82 is configured to fasten the base member 12 to the bracket 83. In the present embodiment, the cable holder 80 is configured to be attached to the base fastener 82 to hold the cable EC1.

The derailleur body 11 includes a base fastener 84 configured to be attached to the base member 12. The base fastener 84 is configured to fasten the base member 12 to the bicycle frame 2A. The base fastener 84 is configured to fasten the bracket 83 to the bicycle frame 2A.

Figure 5:
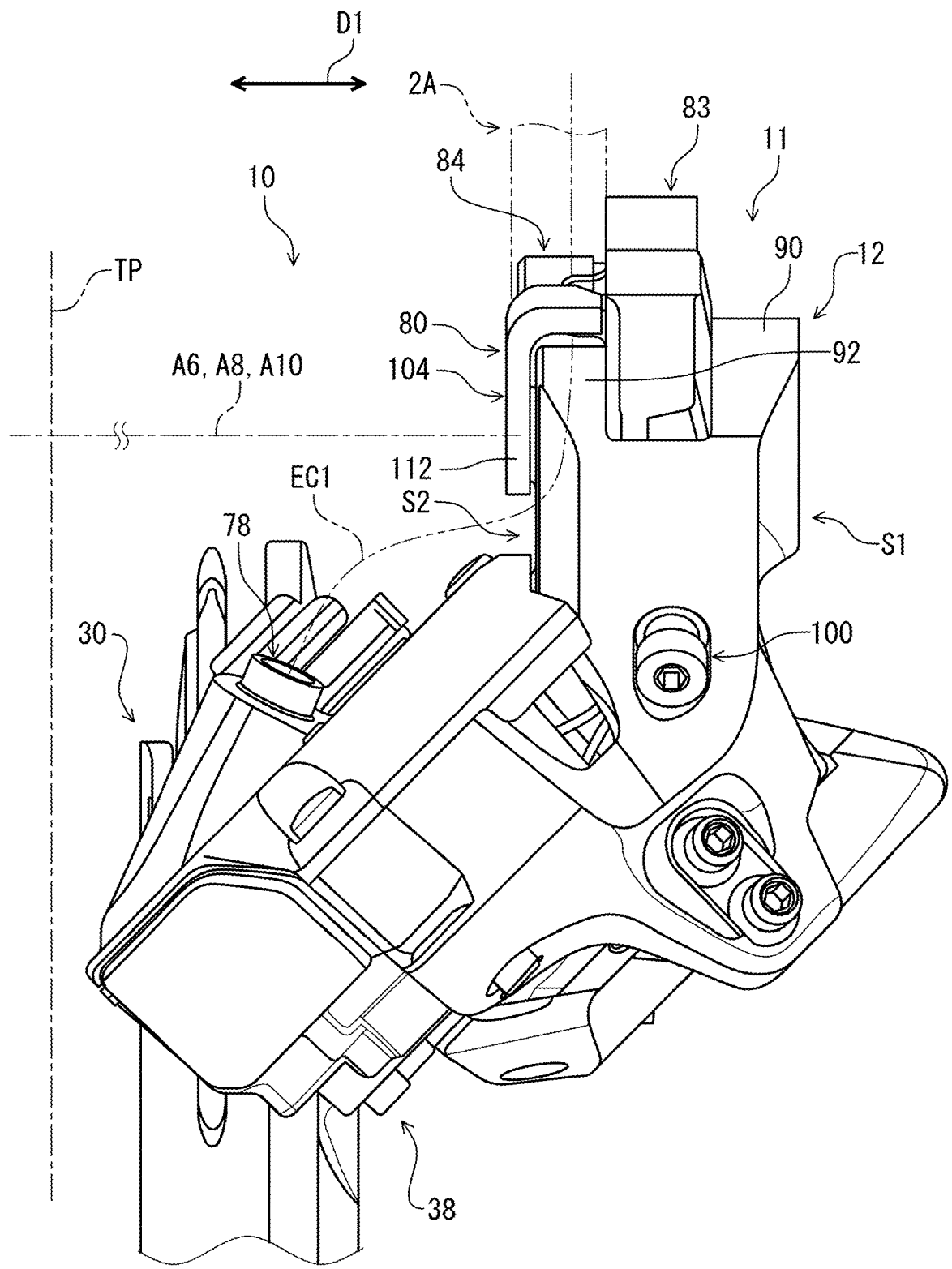
FIG. 5 is a rear view of the bicycle derailleur illustrated in FIG. 1.

As seen in FIG. 5, the derailleur body 11 includes an outward side S1 and an inward side S2 provided on a reverse side of the outward side S1. The inward side S2 is provided closer to a transverse center plane TP of the bicycle frame 2A than the outward side S1 in a mounting state where the derailleur body 11 is mounted to the bicycle frame 2A. In the present embodiment, the cable holder 80 is configured to be attached to the inward side S2. However, the cable holder 80 can be configured to be attached to the outward side S1 if needed and/or desired.

Figure 6:
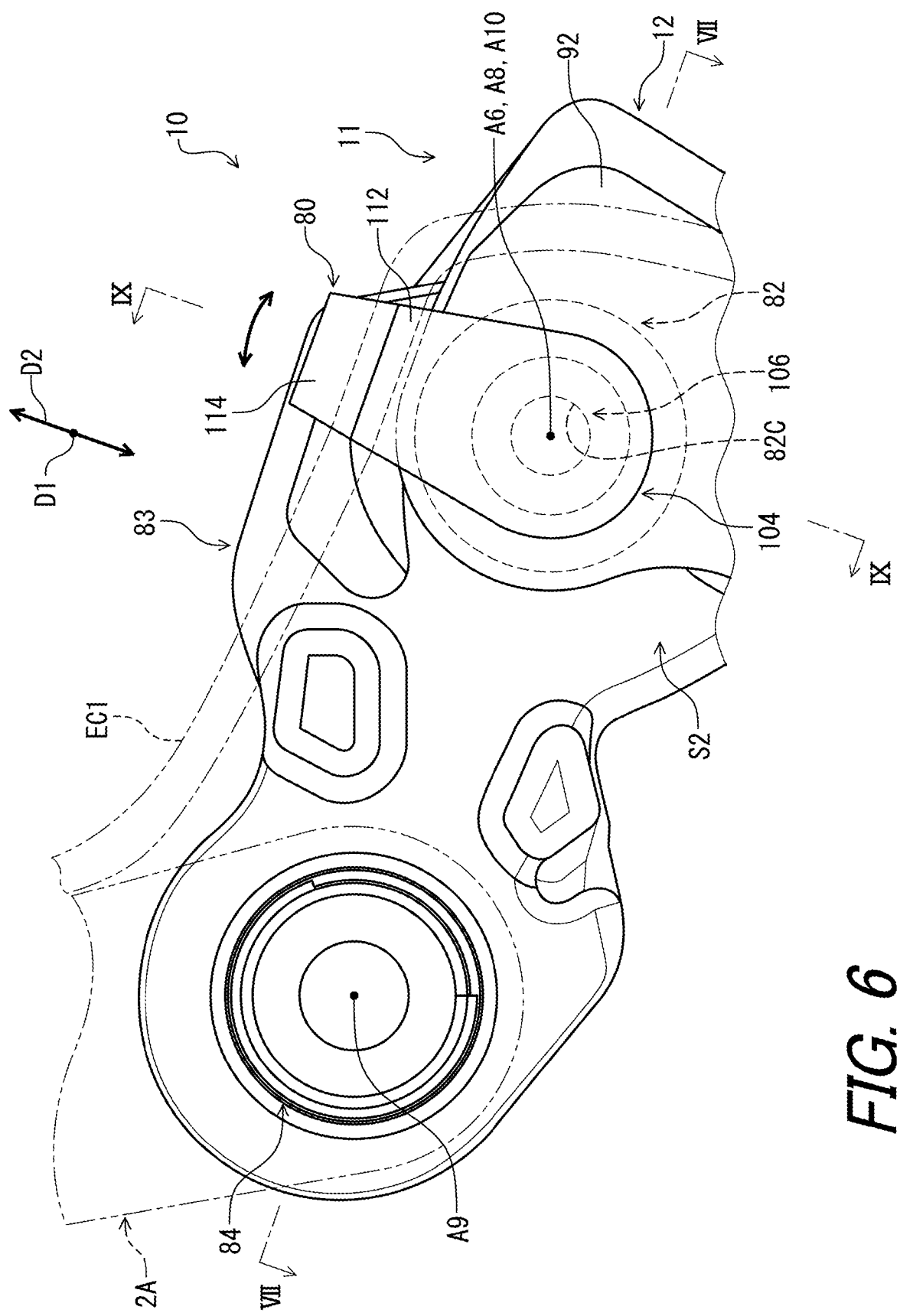
FIG. 6 is an enlarged partial side elevational view of the bicycle derailleur illustrated in FIG. 1.

As seen in FIG. 6, the cable holder 80 is configured to be movably coupled to the derailleur body 11. The cable holder 80 is configured to be pivotally coupled to the derailleur body 11. The cable holder 80 is pivotable relative to the derailleur body 11 about a pivot axis A6. However, the cable holder 80 can be coupled to the derailleur body 11 to slide relative to the derailleur body 11. The cable holder 80 can be coupled to the derailleur body 11 not to move relative to the derailleur body 11.

Figure 7:
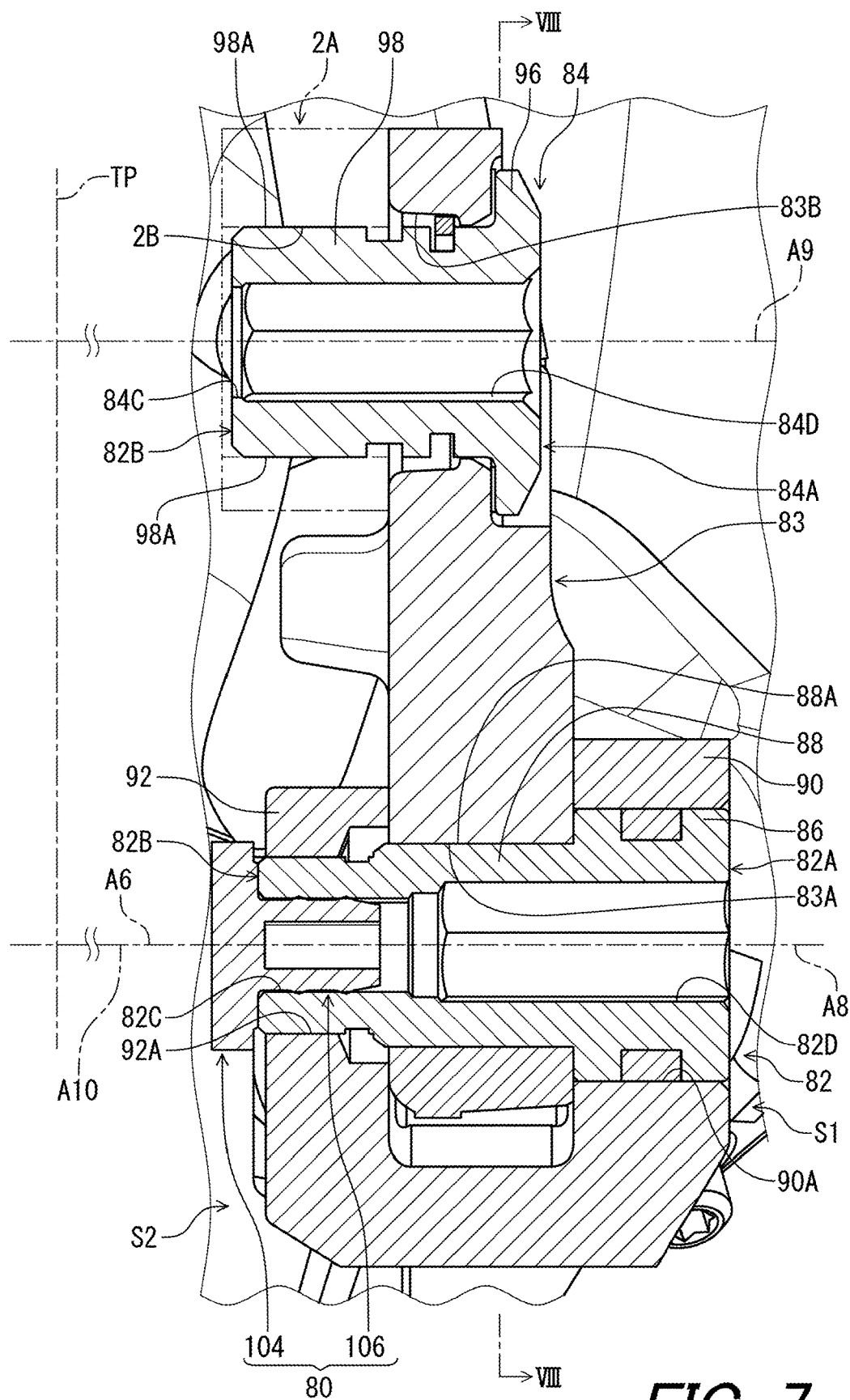
FIG. 7 is a cross-sectional view of the bicycle derailleur along line VII-VII of FIG. 6.

As seen in FIG. 7, the base fastener 82 includes a longitudinal axis A8, a first end 82A, and a second end 82B. The base fastener 82 extends between the first end 82A and the second end 82B along the longitudinal axis A8. The second end 82B of the base fastener 82 is provided closer to the transverse center plane TP of the bicycle frame 2A than the first end 82A of the base fastener 82 in a mounting state where the derailleur body 11 is mounted to the bicycle frame 2A.

The base fastener 82 includes a fastener head 86 and a fastener rod 88. The fastener head 86 includes the first end 82A. The fastener rod 88 extends from the fastener head 86 to the second end 82B and includes an external thread 88A. The bracket 83 includes a threaded hole 83A. The external thread 88A of the fastener rod 88 is configured to be threadedly engaged with the threaded hole 83A. The fastener head 86 is in contact with the bracket 83. The base fastener 82 is secured to the bracket 83.

The base member 12 includes a first coupling part 90 and a second coupling part 92. The second coupling part 92 is spaced apart from the first coupling part 90. The bracket 83 is provide between the first coupling part 90 and the second coupling part 92. The first coupling part 90 includes a first opening 90A. The second coupling part 92 includes a second opening 92A. The base fastener 82 extends through the first opening 90A, the threaded hole, and the second opening 92A. The base fastener 82 is at least partly provided in the first opening 90A. The base fastener 82 is at least partly provided in the second opening 92A. The fastener head 86 is pivotally provided in the first opening 90A. The fastener rod 88 is pivotally provided in the second opening 92A. Thus, the base fastener 82 is configured to pivotally couple the base member 12 to the bicycle frame 2A about the pivot axis A6.

As seen in FIG. 7, the base fastener 84 includes a longitudinal axis A9, a first end 84A, and a second end 84B. The base fastener 84 extends between the first end 84A and the second end 84B along the longitudinal axis A9. The second end 84B of the base fastener 84 is provided closer to the transverse center plane TP of the bicycle frame 2A than the first end 84A of the base fastener 84 in the mounting state where the derailleur body 11 is mounted to the bicycle frame 2A. The pivot axis A6 is coincident with the longitudinal axis A9 of the base fastener 84. However, the pivot axis A6 can be offset from the longitudinal axis A9 of the base fastener 84.

The base fastener 84 includes a fastener head 96 and a fastener rod 98. The fastener head 96 includes the first end 84A. The fastener rod 98 extends from the fastener head 96 to the second end 84B and includes an external thread 98A. The bracket 83 includes a through hole 83B. The bicycle frame 2A includes a frame threaded hole 2B. The external thread 98A of the fastener rod 98 is configured to be threadedly engaged with the frame threaded hole 2B. The base fastener 84 extends through the through hole 83B.

The base fastener 84 includes an attachment hole 84C provided at the second end 84B of the base fastener 84. The base fastener 84 includes a tool engagement hole 84D provided at the first end 84A to be engaged with a tool. The attachment hole 84C is connected to the tool engagement hole 84D. The attachment hole 84C and the tool engagement hole 84D constitute a through-hole.

Figure 8:
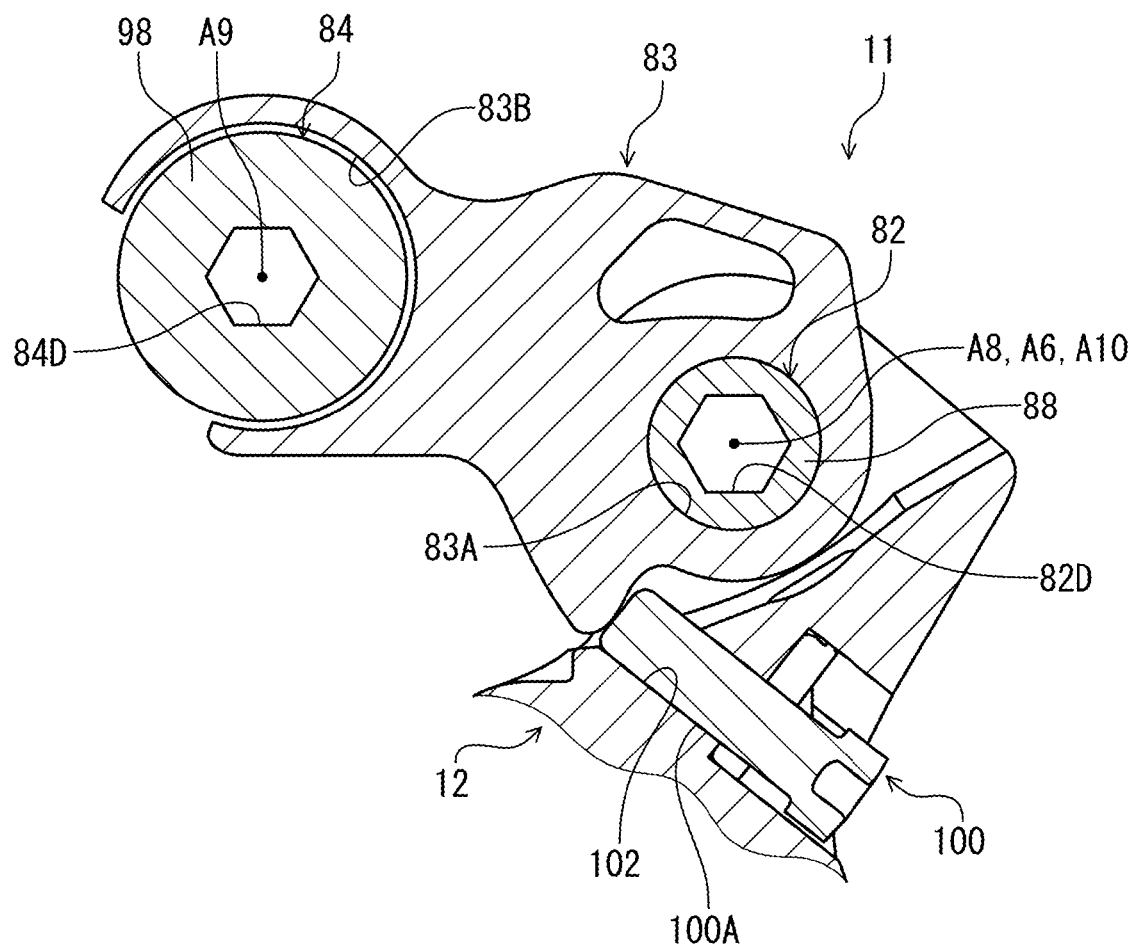
FIG. 8 is a cross-sectional view of the bicycle derailleur along line VIII-VIII of FIG. 7.

As seen in FIG. 8, the derailleur body 11 includes an adjustment member 100. The adjustment member 100 is attached to the base member 12 to change the position of the base member 12 relative to the bracket 83. The adjustment member 100 includes an adjustment external thread 100A. The base member 12 includes an adjustment threaded hole 102. The adjustment member 100 is threadedly engaged with the adjustment threaded hole 102. The adjustment member 100 is in contact with the bracket 83. Rotation of the adjustment member 100 changes the position of the base member 12 relative to the bracket 83 about the pivot axis A6.

Figure 9:
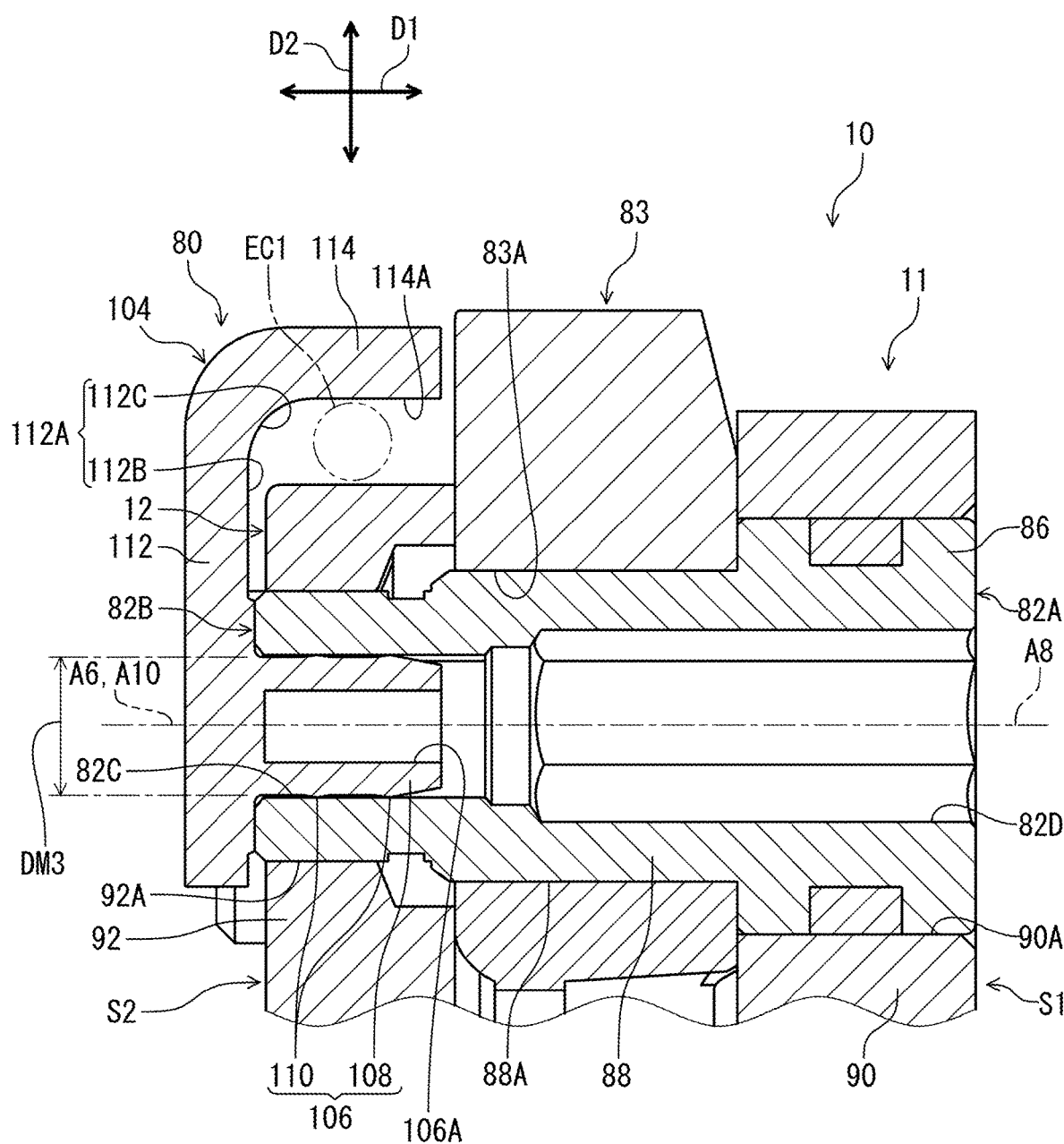
FIG. 9 is a cross-sectional view of the bicycle derailleur along line IX-IX of FIG. 6.

As seen in FIG. 9, the cable holder 80 is configured to be attached to at least one of the first end 82A and the second end 82B of the base fastener 82 to hold the cable EC1. In the present embodiment, the cable holder 80 is configured to be attached to the second end 82B of the base fastener 82. However, the cable holder 80 can be configured to be attached to the first end 82A of the base fastener 82.

The cable holder 80 is configured to restrict the electric cable EC1 from moving relative to the derailleur body 11 in a first direction D1 defined along the longitudinal axis A8 of the base fastener 82. The cable holder 80 is configured to restrict the electric cable from moving relative to the derailleur body 11 in a second direction D2 different from the first direction D1. In the present embodiment, the second direction D2 is perpendicular to the first direction D1. However, the second direction D2 can be non-perpendicular to the first direction D1.

The base fastener 82 includes an attachment hole 82C provided at the second end 82B of the base fastener 82. The base fastener 82 includes a tool engagement hole 82D provided at the first end 82A to be engaged with a tool. The attachment hole 82C is connected to the tool engagement hole 82D. The attachment hole 82C and the tool engagement hole 82D constitute a through-hole. The cable holder 80 is configured to be at least partly provided in the attachment hole 82C.

In the present embodiment, the cable holder 80 is configured to be partly provided in the attachment hole 82C. The attachment hole 82C includes a circular hole. The tool engagement hole 82D is configured to be engaged with a tool such as a hexagonal wrench. The tool engagement hole 82D includes a hexagonal socket. However, the shapes of the attachment hole 82C and the tool engagement hole 82D are not limited to the above shapes. The cable holder 80 can be configured to be entirely provided in the attachment hole 82C.

Figure 10:
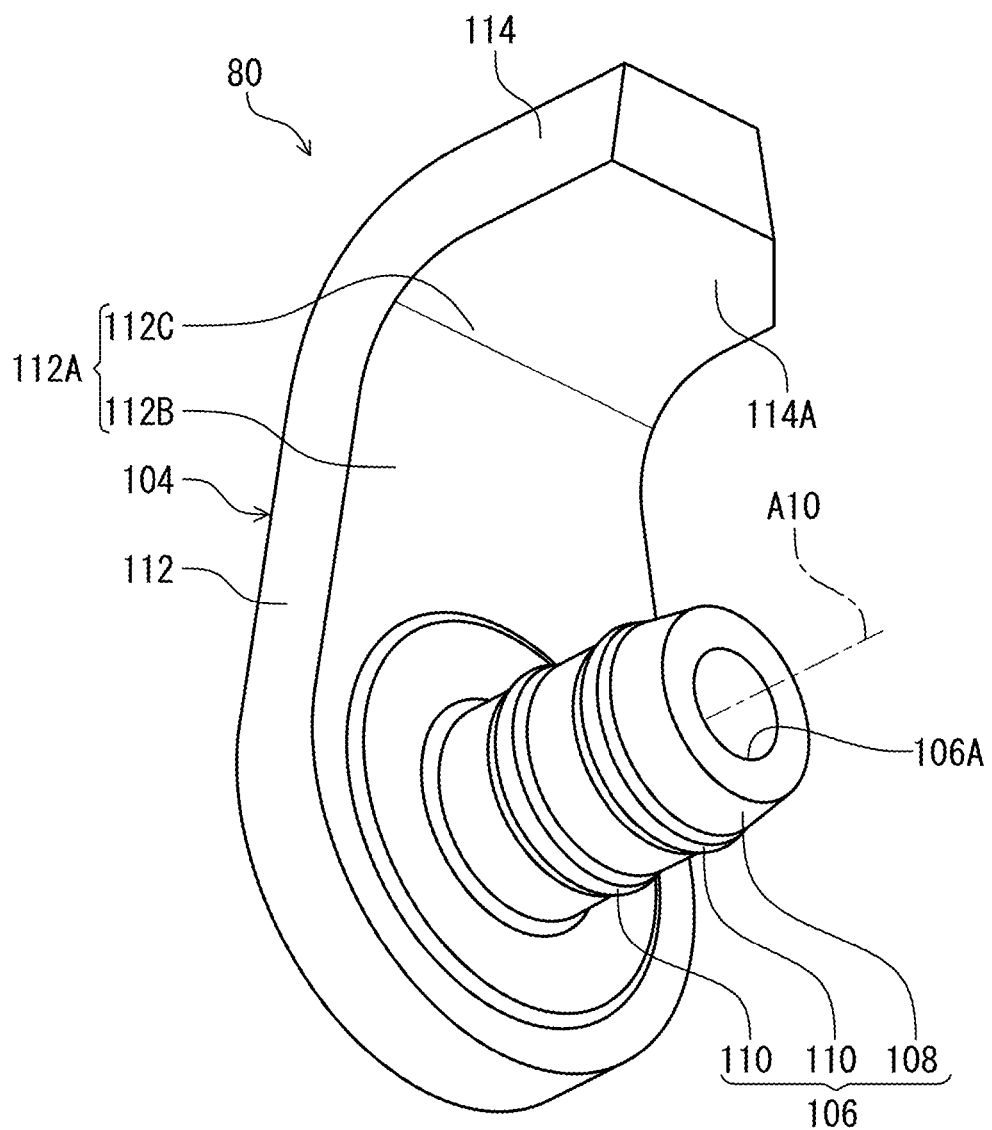
FIG. 10 is a perspective view of a cable holder of the bicycle derailleur illustrated in FIG. 1.

As seen in FIG. 10, the cable holder 80 includes a holder body 104. Namely, the electric cable holder 80 for the bicycle derailleur 10 comprises the holder body 104. The holder body 104 is configured to be contactable with the electric cable EC1.

The electric cable holder 80 for the bicycle derailleur comprises an attachment body 106. The attachment body 106 includes an attachment protrusion 108. Namely, the cable holder 80 includes the attachment protrusion 108. The attachment body 106 extends from the holder body 104. The attachment protrusion 108 extends from the holder body 104.

In the present embodiment, the attachment protrusion 108 has a tubular shape. The attachment body 106 has a longitudinal center axis A10. The attachment body 106 extends along the longitudinal center axis A10. The longitudinal center axis A10 is coincident with the pivot axis A6 and the longitudinal axis A9 of the base fastener 84 (see, e.g., FIG. 9). The attachment protrusion 108 extends along the longitudinal center axis A10. The attachment body 106 includes a hole 106A. The attachment protrusion 108 includes the hole 106A. However, the attachment body 106 can have shapes other than the tubular shape. The longitudinal center axis A10 can be offset from at least one of the pivot axis A6 and the longitudinal axis A9 of the base fastener 84 (see, e.g., FIG. 9).

The attachment body 106 includes at least one larger-diameter part 110 provided on an outer peripheral surface of the attachment protrusion 108. In the present embodiment, the attachment body 106 includes a plurality of larger-diameter parts 110 provided on the outer peripheral surface of the attachment protrusion 108. The larger-diameter parts 110 are spaced apart from each other along the longitudinal axis A8.

Figure 11:
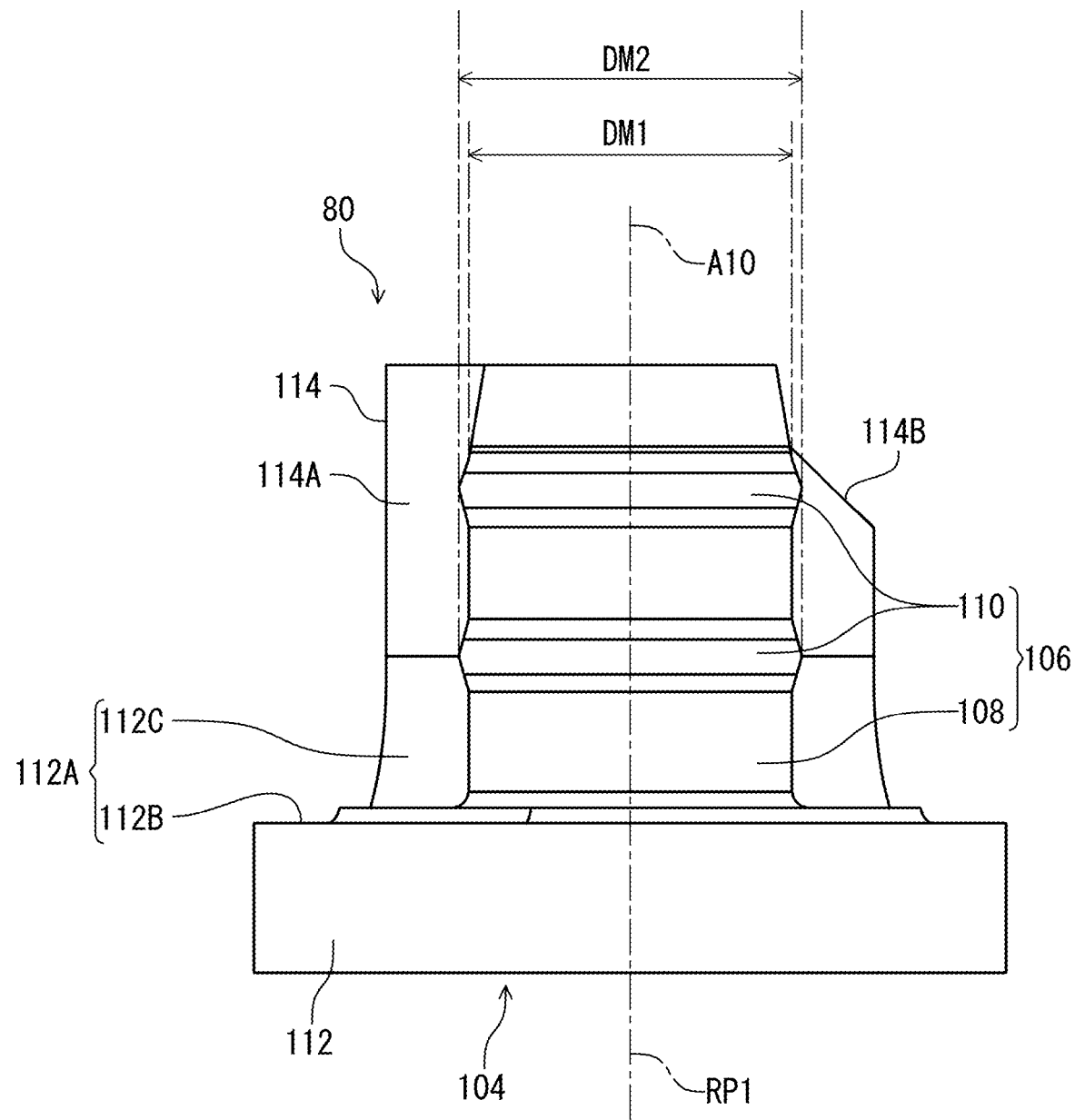
FIG. 11 is a bottom view of the cable holder of the bicycle derailleur illustrated in FIG. 1.

As seen in FIG. 11, the attachment protrusion 108 has a first outer diameter DM1. The larger-diameter part 110 has a second outer diameter DM2. The second outer diameter DM2 is larger than the first outer diameter DM1. The attachment body 106 is elastically deformable in a radial direction with respect to the longitudinal center axis A10.

Thus, each of the first outer diameter DM1 of the attachment protrusion 108 and the second outer diameter DM2 of the larger-diameter part 110 is variable in response to the elastic deformation of the attachment body 106.

As seen in FIG. 9, the attachment body 106 is configured to be attached to the bicycle derailleur 10. The attachment body 106 is configured to be attached to the derailleur body 11. The attachment body 106 is configured to be at least partly provided in the attachment hole 82C. The attachment protrusion 108 is configured to be at least partly provided in the attachment hole 82C. In the present embodiment, the attachment body 106 is configured to be entirely provided in the attachment hole 82C. The attachment protrusion 108 is configured to be entirely provided in the attachment hole 82C. However, the attachment body 106 can be configured to be partly provided in the attachment hole 82C. The attachment protrusion 108 can be configured to be partly provided in the attachment hole 82C.

The attachment hole 82C has an inner diameter DM3. The first outer diameter DM1 (see, e.g., FIG. 10) of the attachment protrusion 108 is smaller than the inner diameter DM3 of the attachment hole 82C. The second outer diameter DM2 (see, e.g., FIG. 10) of the larger-diameter part 110 is larger than the inner diameter DM3 of the attachment hole 82C. Thus, the larger-diameter parts 110 are elastically deformed in a state where the attachment body 106 is provided in the attachment hole 82C. Friction generated between the attachment body 106 and the base fastener 82 can stabilize the orientation of the cable holder 80 relative to the base fastener 82. Friction generated between the attachment body 106 and the base fastener 82 can restrict the cable holder 80 from being dropped off from the base fastener 82.

The holder body 104 is configured to hold the electric cable EC1 between the holder body 104 and the base member 12. The holder body 104 includes a first holder body 112 and a second holder body 114. The first holder body 112 is coupled to the attachment body 106. The first holder body 112 is coupled to the attachment protrusion 108.

The second holder body 114 extends from the first holder body 112. The second holder body 114 extends from the first holder body 112 along the longitudinal center axis A10. The second holder body 114 is spaced apart from the attachment body 106. The second holder body 114 is spaced apart from the attachment protrusion 108.

The first holder body 112 includes a first support surface 112A. The first support surface 112A at least partly faces in the first direction D1. The attachment body 106 extends from the first support surface 112A. The attachment protrusion 108 extends from the first support surface 112A. The first support surface 112A includes a flat surface 112B and a curved surface 112C.

The second holder body 114 includes a second support surface 114A. The second support surface 114A at least partly faces in the second direction D2. The second support surface 114A is configured to face toward the attachment body 106. The second support surface 114A is configured to face toward the attachment protrusion 108. The second support surface 114A is configured to face toward the base member 12 in an attachment state where the cable holder 80 is attached to the base fastener 82 and the base fastener 82 is attached to the base member 12.

In the present embodiment, the cable holder 80 is made of a non-metallic material. For example, the cable holder 80 is made of a resin material. The cable holder 80 is made of an elastic material. However, the cable holder 80 can be made of a metallic material or other materials if needed and/or desired.

The holder body 104 is integrally provided with the attachment body 106 as a one-piece unitary member. However, the holder body 104 can be a separate member from the attachment body 106 if needed and/or desired.

Figure 12:
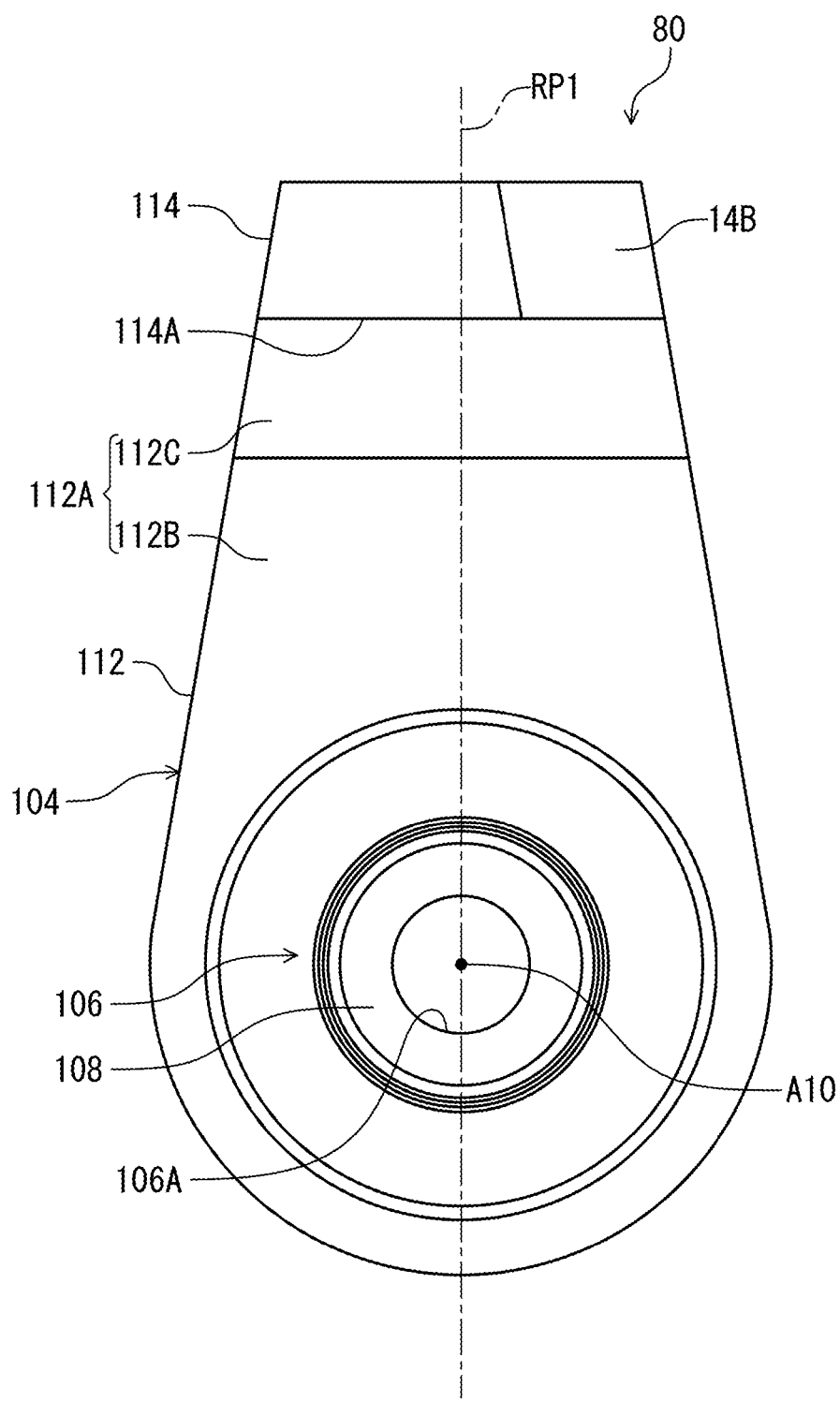
FIG. 12 is a side elevational view of the cable holder of the bicycle derailleur illustrated in FIG. 1.
Figure 13:
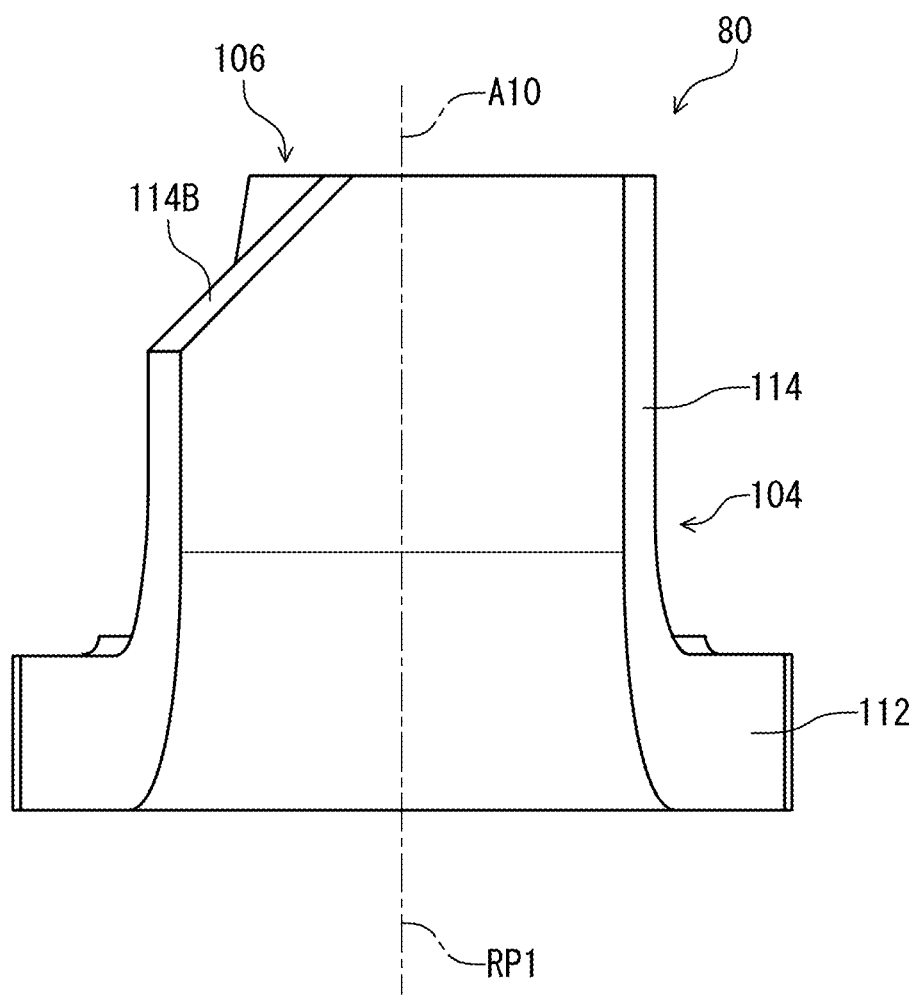
FIG. 13 is a top view of the cable holder of the bicycle derailleur illustrated in FIG. 1.

As seen in FIGS. 11 to 13, the cable holder 80 has an asymmetrical shape with respect to a reference plane RP1 including the longitudinal center axis A10. The reference plane RP1 is perpendicular to the flat surface 112B and the second support surface 114A. The second holder body 114 includes an inclined surface 114B. The inclined surface 114B is inclined relative to the reference plane RP1. However, the cable holder 80 can have a symmetrical shape with respect to the reference plane RP1 if needed and/or desired.

Second Embodiment

A bicycle derailleur 210 in accordance with a second embodiment will be described below referring to FIGS. 14 to 20. The bicycle derailleur 210 has the same structure and/or configuration as those of the bicycle derailleur 10 except for the cable holder 80. Thus, elements having substantially the same function as those in the first embodiment will be numbered the same here, and will not be described and/or illustrated again in detail here for the sake of brevity.

Figure 14:
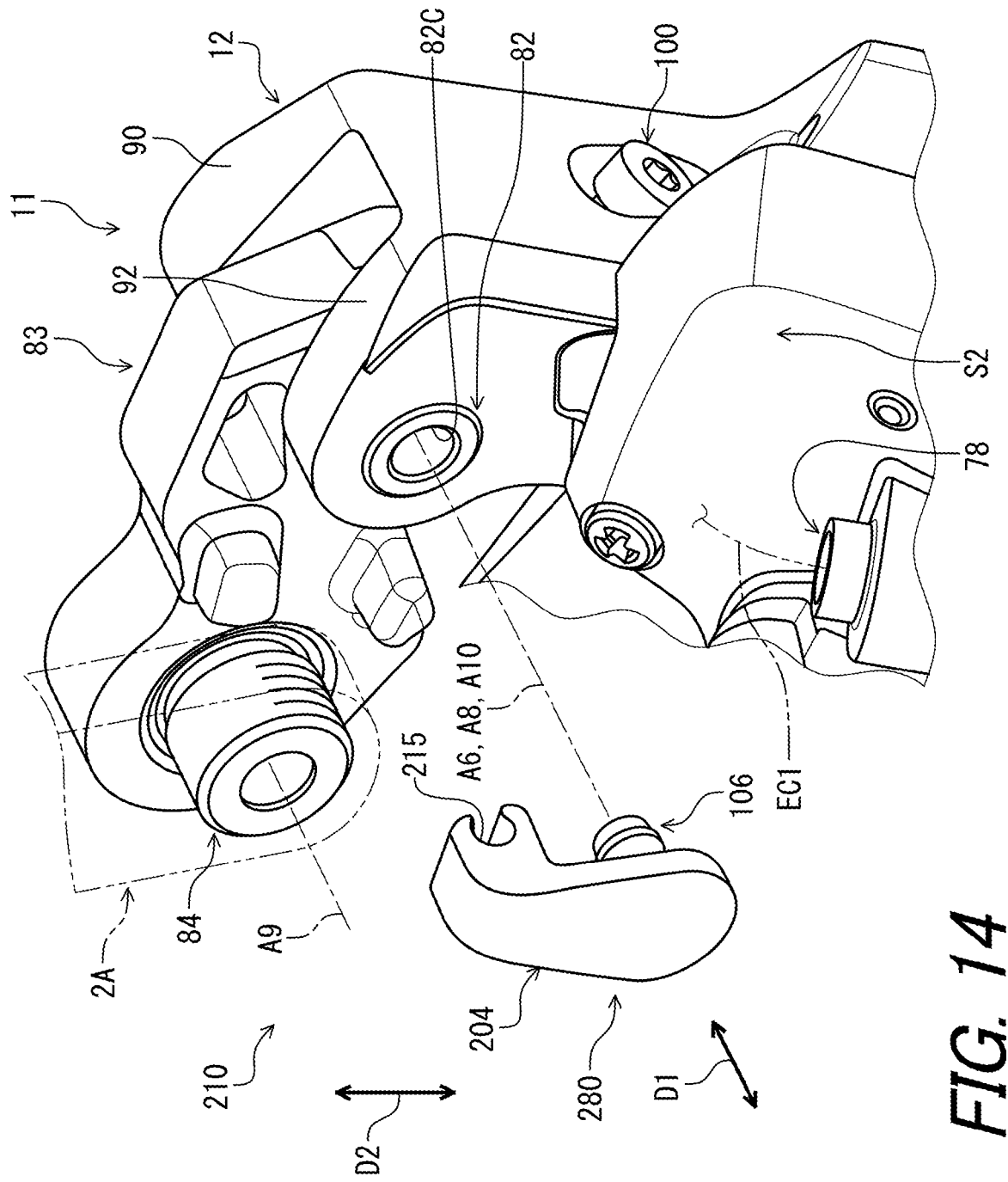
FIG. 14 is an exploded perspective view of the bicycle derailleur in accordance with a second embodiment.

As seen in FIG. 14, the bicycle derailleur 210 comprises the derailleur body 11 and a cable holder 280. The cable holder 280 has substantially the same structure as that of the cable holder 80 of the first embodiment. The cable holder 280 can also be referred to as an electric cable holder 280.

Figure 15:
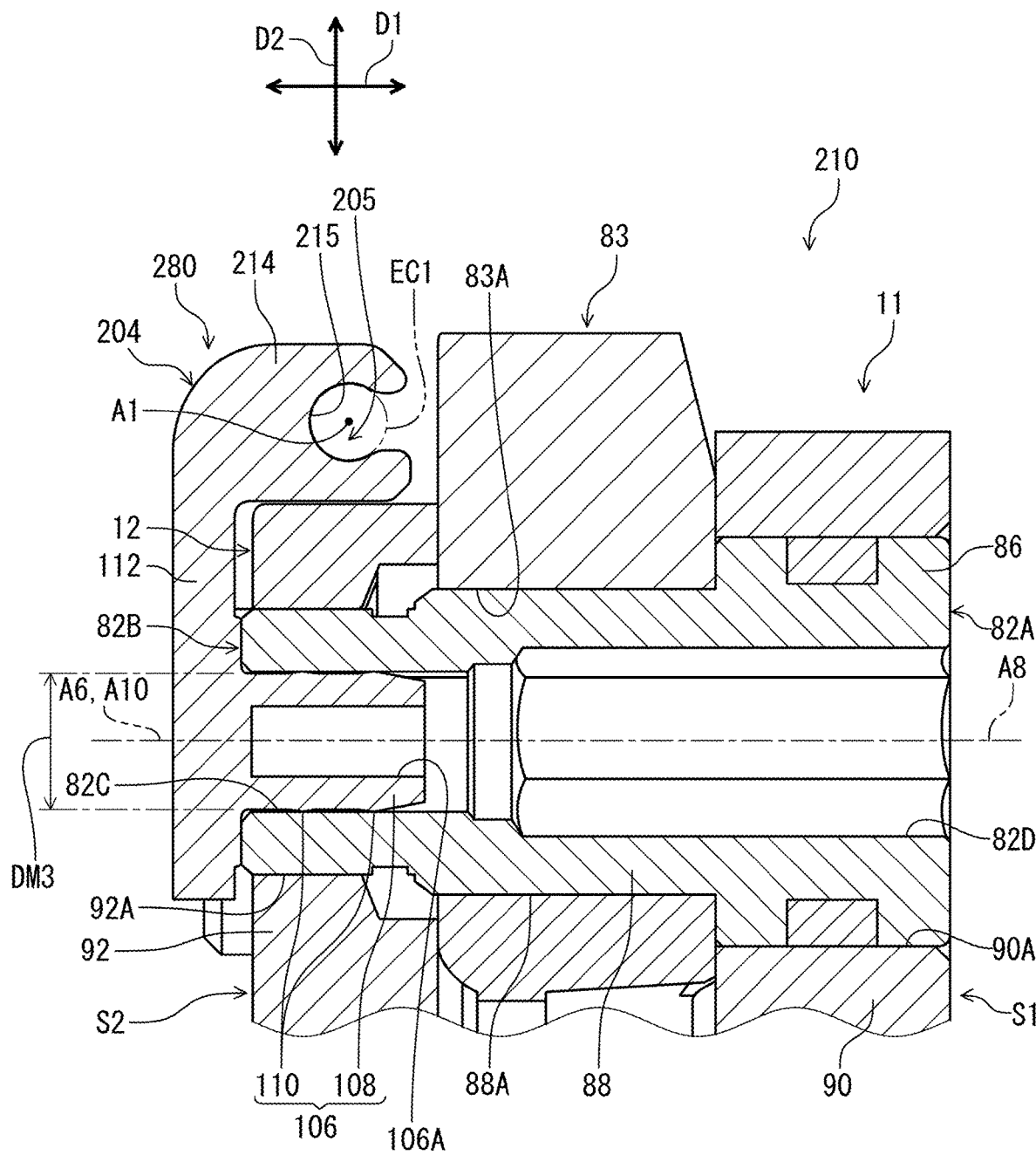
FIG. 15 is a cross-sectional view of the bicycle derailleur along line XV-XV of FIG. 17.

As seen in FIG. 15, the cable holder 280 is configured to hold the electric cable EC1. The cable holder 280 is configured to be attached to the inward side S2. The cable holder 280 is configured to be attached to the base fastener 82 to hold the cable EC1.

The cable holder 280 is configured to be attached to at least one of the first end 82A and the second end 82B of the base fastener 82 to hold the cable EC1. In the present embodiment, the cable holder 280 is configured to be attached to the second end 82B of the base fastener 82. However, the cable holder 280 can be configured to be attached to the first end 82A of the base fastener 82.

The cable holder 280 is configured to restrict the electric cable EC1 from moving relative to the derailleur body 11 in the first direction D1 defined along the longitudinal axis A8 of the base fastener 82. The cable holder 280 is configured to restrict the electric cable EC1 from moving relative to the derailleur body 11 in the second direction D2 different from the first direction D1.

The cable holder 280 includes a holder body 204. Namely, the electric cable holder 280 for the bicycle derailleur 10 comprises the holder body 204. The holder body 204 is configured to be contactable with the electric cable EC1. The holder body 204 has substantially the same structure as that of the holder body 104 of the first embodiment.

The electric cable holder 280 for the bicycle derailleur 210 comprises the attachment body 106. Namely, the cable holder 280 includes the attachment protrusion 108. The attachment body 106 extends from the holder body 204. The attachment protrusion 108 extends from the holder body 204.

The cable holder 280 is configured to be at least partly provided in the attachment hole 82C. In the present embodiment, the cable holder 280 is configured to be partly provided in the attachment hole 82C. The attachment protrusion 108 is configured to be at least partly provided in the attachment hole 82C. The cable holder 280 is configured to be partly provided in the attachment hole 82C. However, the cable holder 280 can be configured to be entirely provided in the attachment hole 82C.

Figure 16:
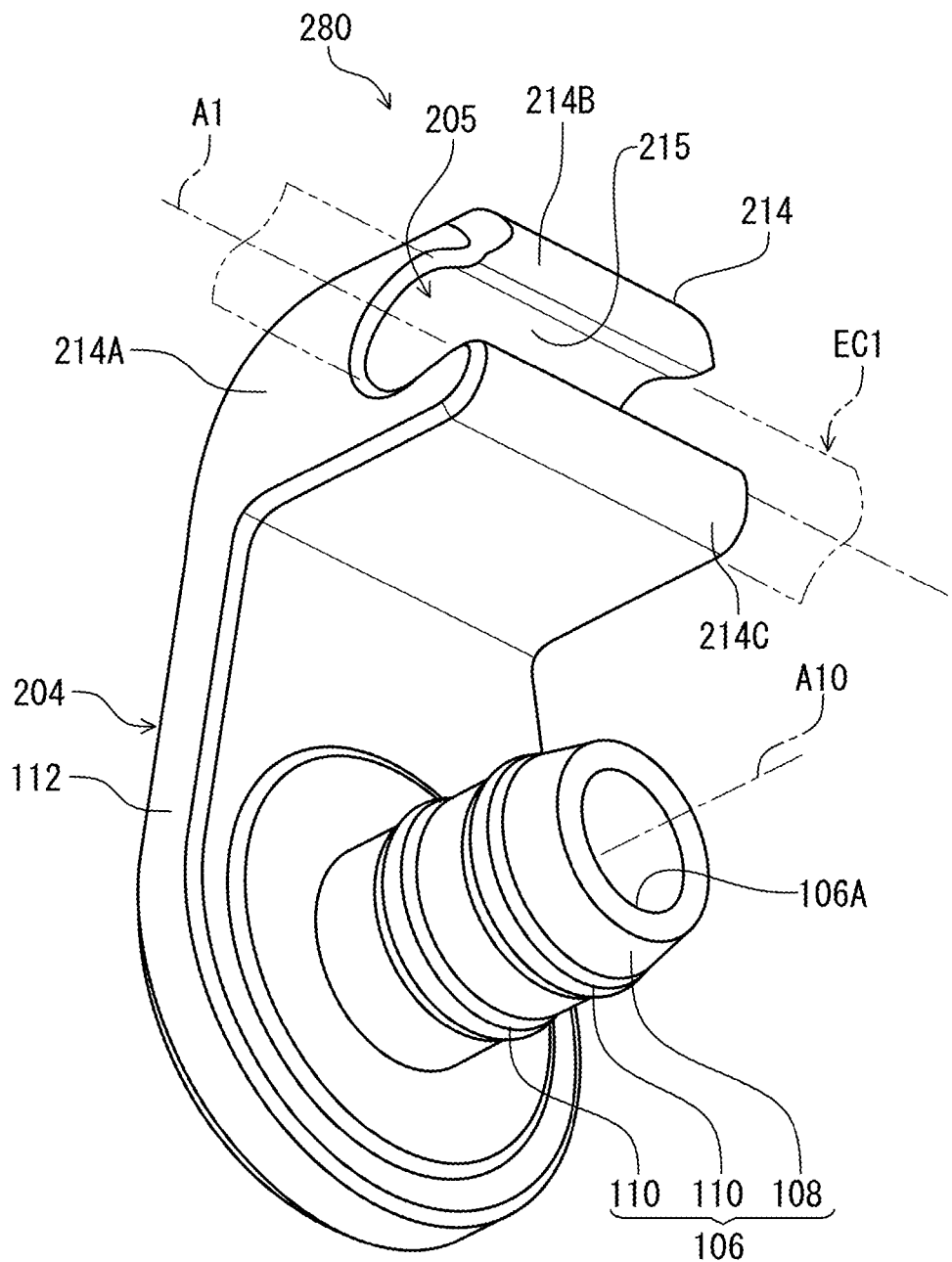
FIG. 16 is a perspective view of a cable holder of the bicycle derailleur illustrated in FIG. 1.

As seen in FIG. 16, the holder body 204 includes the first holder body 112 and a second holder body 214. The second holder body 214 extends from the first holder body 112. The second holder body 214 extends from the first holder body 112 along the longitudinal center axis A10. The second holder body 214 is spaced apart from the attachment body 106. The second holder body 214 is spaced apart from the attachment protrusion 108.

The holder body 204 includes a holder groove 205 in which the electric cable EC1 is to be provided. The second holder body 214 includes the holder groove 205. The second holder body 214 includes a curved inner surface 215 defining the holder groove 205. The holder groove 205 has a first linkage axis A1. The holder groove 205 extends along the first linkage axis A1.

The second holder body 214 includes a base part 214A, a first extending part 214B, and a second extending part 214C. The base part 214A is coupled to the first holder body 112. The first extending part 214B extends from the base part 214A. The second extending part 214C extends from the base part 214A. The first extending part 214B and the second extending part 214C are spaced apart from each other to define the holder groove 205.

Figure 17:
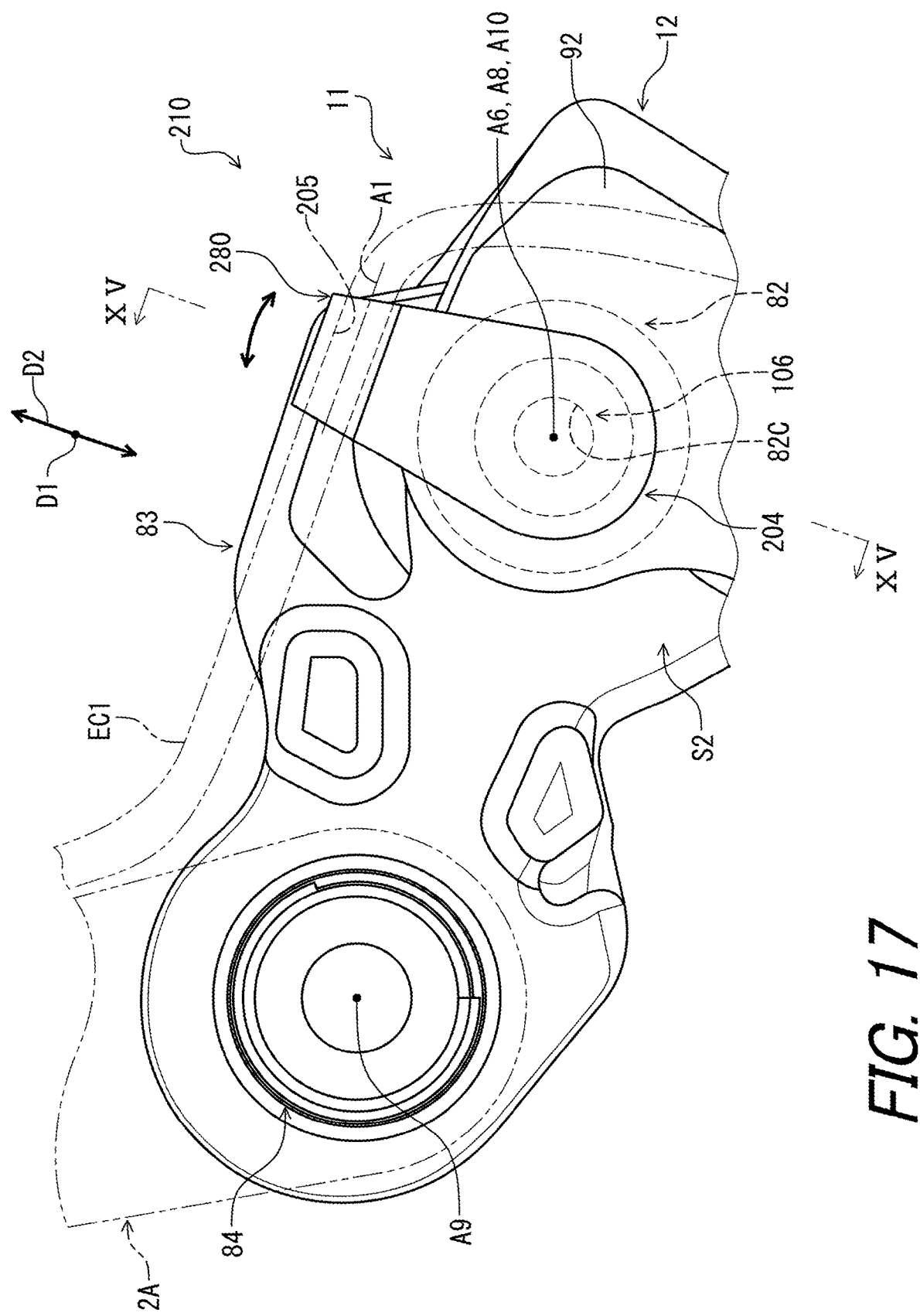
FIG. 17 is an enlarged partial side elevational view of the bicycle derailleur illustrated in FIG. 14.

As seen in FIG. 17, the holder groove 205 extends in a direction which is non-parallel to the longitudinal axis A8 of the base fastener 82 in an attachment state where the cable holder 280 is attached to the base fastener 82 and the base fastener 82 is attached to the base member 12. However, the holder groove 205 can extend in a direction which is parallel to the longitudinal axis A8 of the base fastener 82 in the attachment state.

The cable holder 280 is configured to be movably coupled to the derailleur body 11. The cable holder 280 is configured to be pivotally coupled to the derailleur body 11. The cable holder 280 is configured to be pivotally coupled to the derailleur body 11 about the pivot axis A6.

Figure 18:
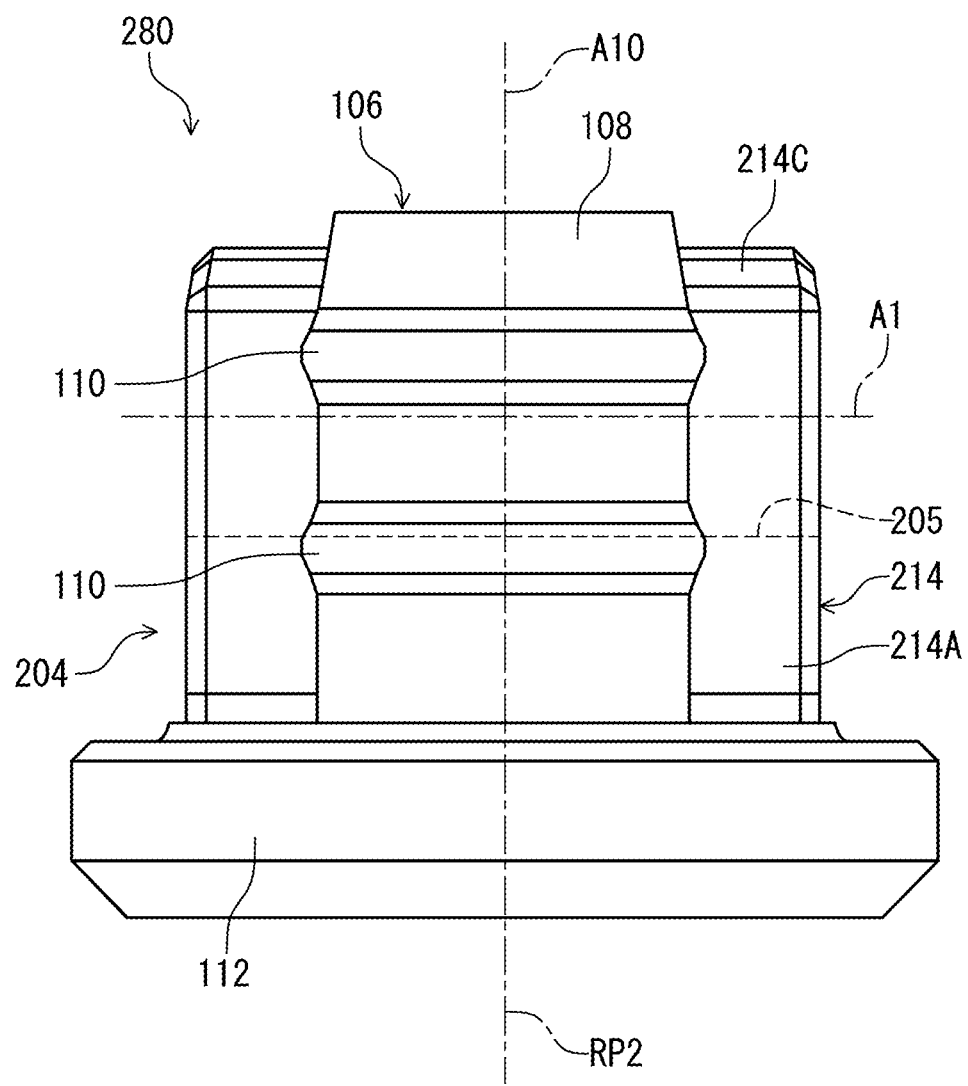
FIG. 18 is a bottom view of the cable holder of the bicycle derailleur illustrated in FIG. 14.
Figure 19:
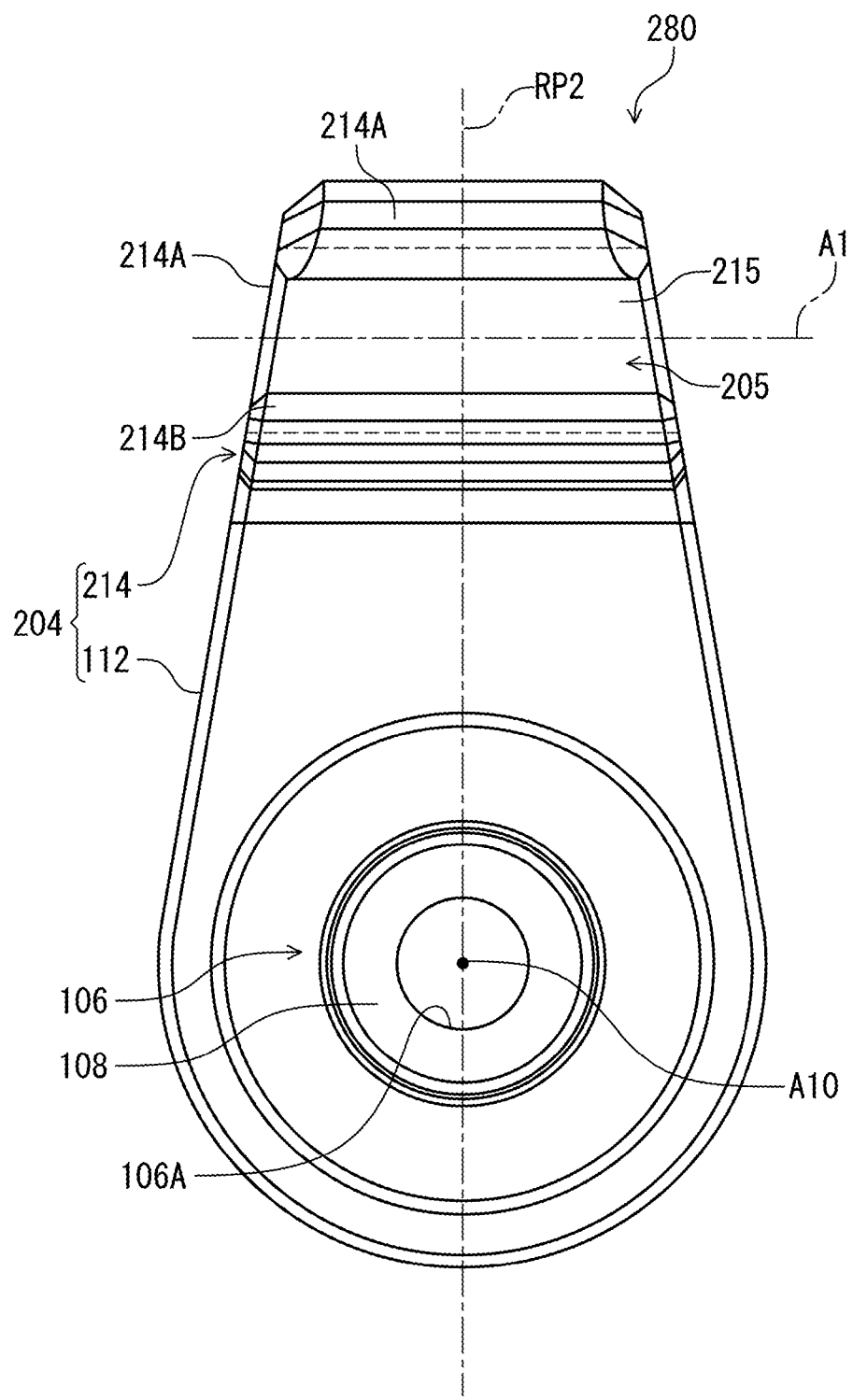
FIG. 19 is a side elevational view of the cable holder of the bicycle derailleur illustrated in FIG. 14.
Figure 20:
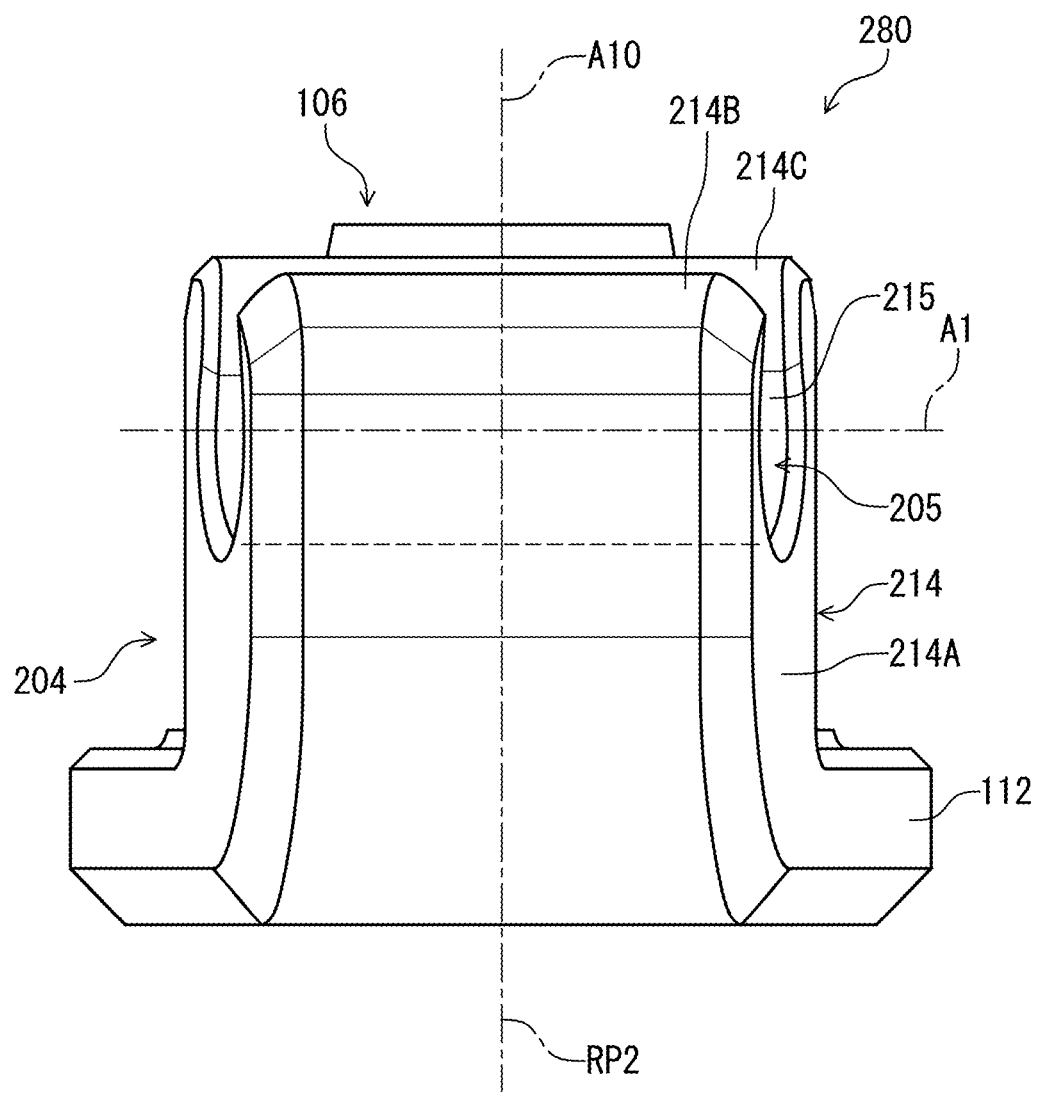
FIG. 20 is a top view of the cable holder of the bicycle derailleur illustrated in FIG. 14.

As seen in FIGS. 18 to 20, the cable holder 280 has a symmetrical shape with respect to a reference plane RP2 including the longitudinal center axis A10. The reference plane RP2 is perpendicular to the first linkage axis A1 of the holder groove 205. However, the cable holder 80 can have an asymmetrical shape with respect to the reference plane RP2 if needed and/or desired.

Third Embodiment

A bicycle derailleur 310 in accordance with a third embodiment will be described below referring to FIGS. 21 to 25. The bicycle derailleur 310 has the same structure and/or configuration as those of the bicycle derailleur 210 except for the cable holder 280. Thus, elements having substantially the same function as those in the above embodiments will be numbered the same here, and will not be described and/or illustrated again in detail here for the sake of brevity.

Figure 21:
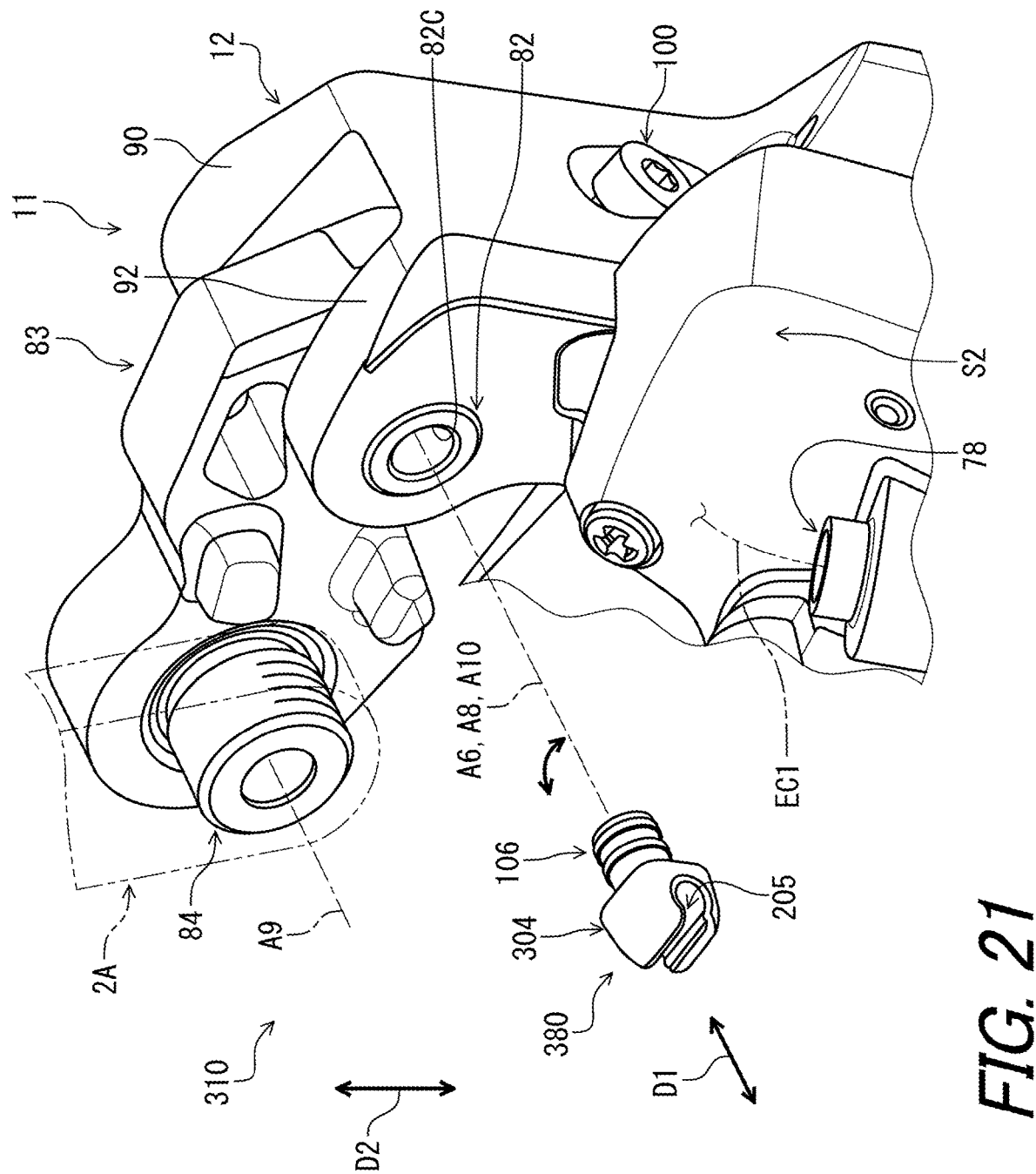
FIG. 21 is an exploded perspective view of the bicycle derailleur in accordance with a third embodiment.

As seen in FIG. 21, the bicycle derailleur 310 comprises the derailleur body 11 and a cable holder 380. The cable holder 380 can also be referred to as an electric cable holder 380.

Figure 22:
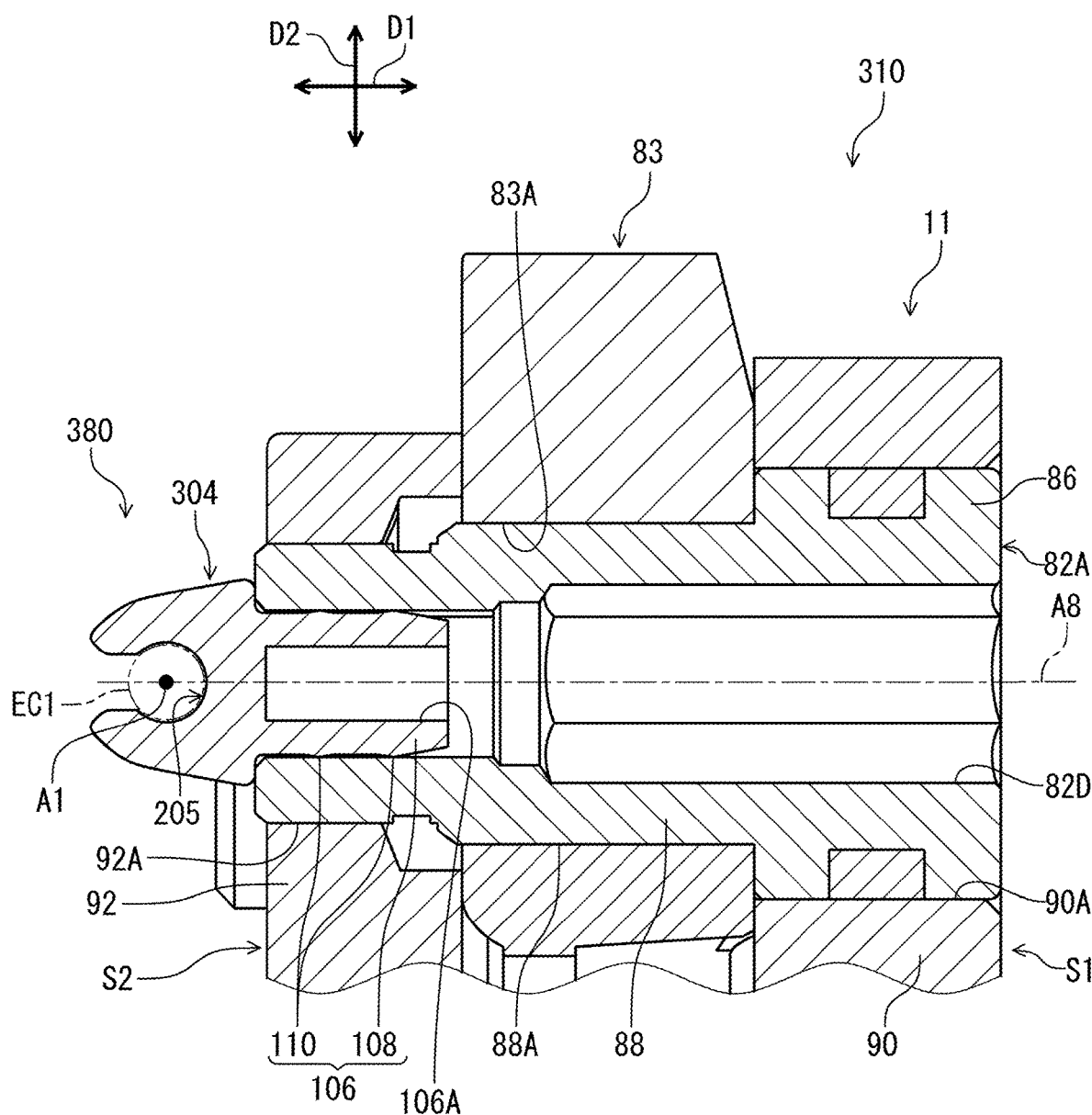
FIG. 22 is a cross-sectional view of the bicycle derailleur illustrated in FIG. 21.

As seen in FIG. 22, the cable holder 380 is configured to hold the electric cable EC1. The cable holder 380 is configured to be attached to the inward side S2. The cable holder 380 is configured to be attached to the base fastener 82 to hold the cable EC1.

The cable holder 380 is configured to be attached to at least one of the first end 82A and the second end 82B of the base fastener 82 to hold the cable EC1. In the present embodiment, the cable holder 380 is configured to be attached to the second end 82B of the base fastener 82. However, the cable holder 380 can be configured to be attached to the first end 82A of the base fastener 82.

The cable holder 380 is configured to restrict the electric cable EC1 from moving relative to the derailleur body 11 in the first direction D1 defined along the longitudinal axis A8 of the base fastener 82. The cable holder 380 is configured to restrict the electric cable EC1 from moving relative to the derailleur body 11 in the second direction D2 different from the first direction D1.

The cable holder 380 includes a holder body 304. Namely, the electric cable holder 380 for the bicycle derailleur 10 comprises the holder body 304. The holder body 304 is configured to be contactable with the electric cable EC1. The holder body 304 has substantially the same structure as that of the holder body 204 of the second embodiment.

The electric cable holder 380 for the bicycle derailleur 310 comprises the attachment body 106. Namely, the cable holder 380 includes the attachment protrusion 108. The attachment body 106 extends from the holder body 304. The attachment protrusion 108 extends from the holder body 304.

The cable holder 380 is configured to be at least partly provided in the attachment hole 82C. In the present embodiment, the cable holder 380 is configured to be partly provided in the attachment hole 82C. The attachment protrusion 108 is configured to be at least partly provided in the attachment hole 82C. The cable holder 380 is configured to be partly provided in the attachment hole 82C. However, the cable holder 380 can be configured to be entirely provided in the attachment hole 82C.

Figure 23:
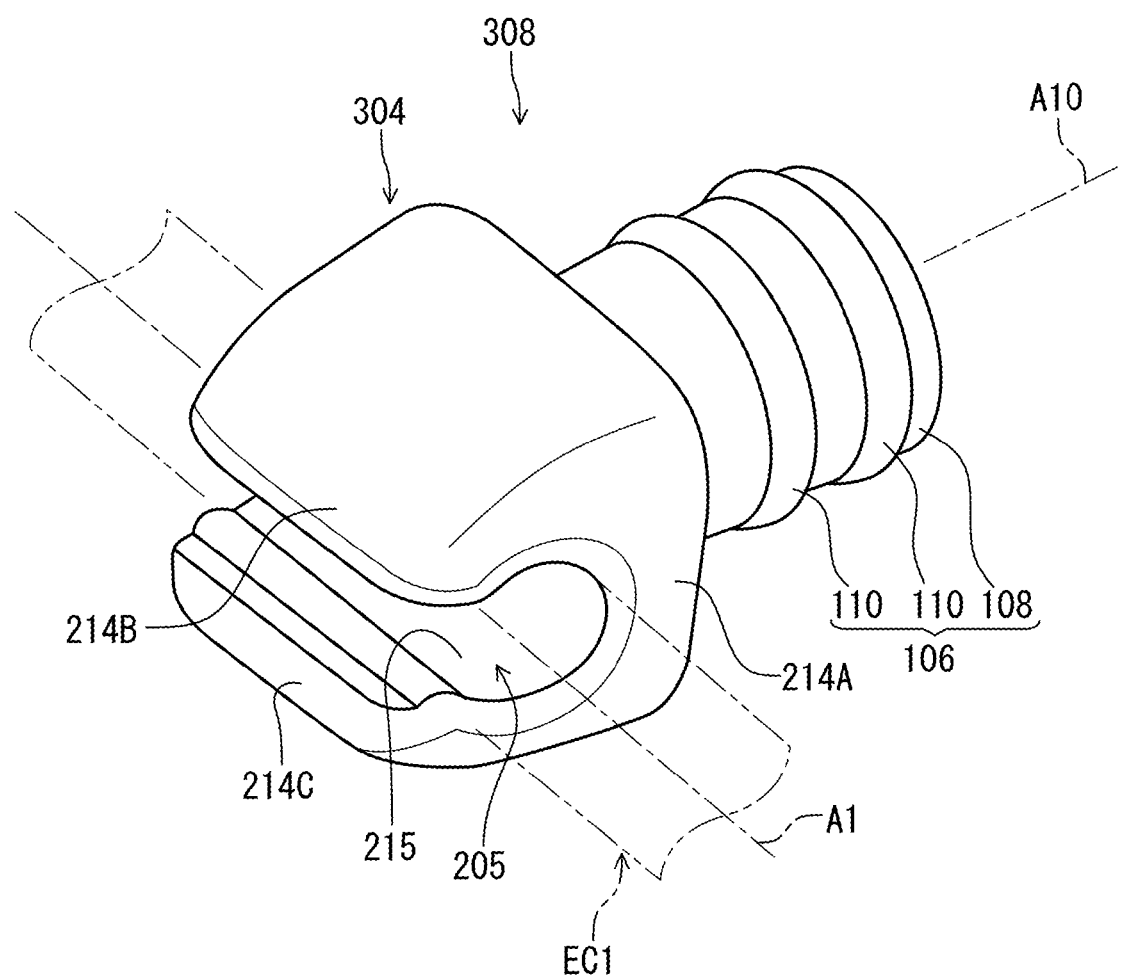
FIG. 23 is a perspective view of a cable holder of the bicycle derailleur illustrated in FIG. 21.
Figure 24:
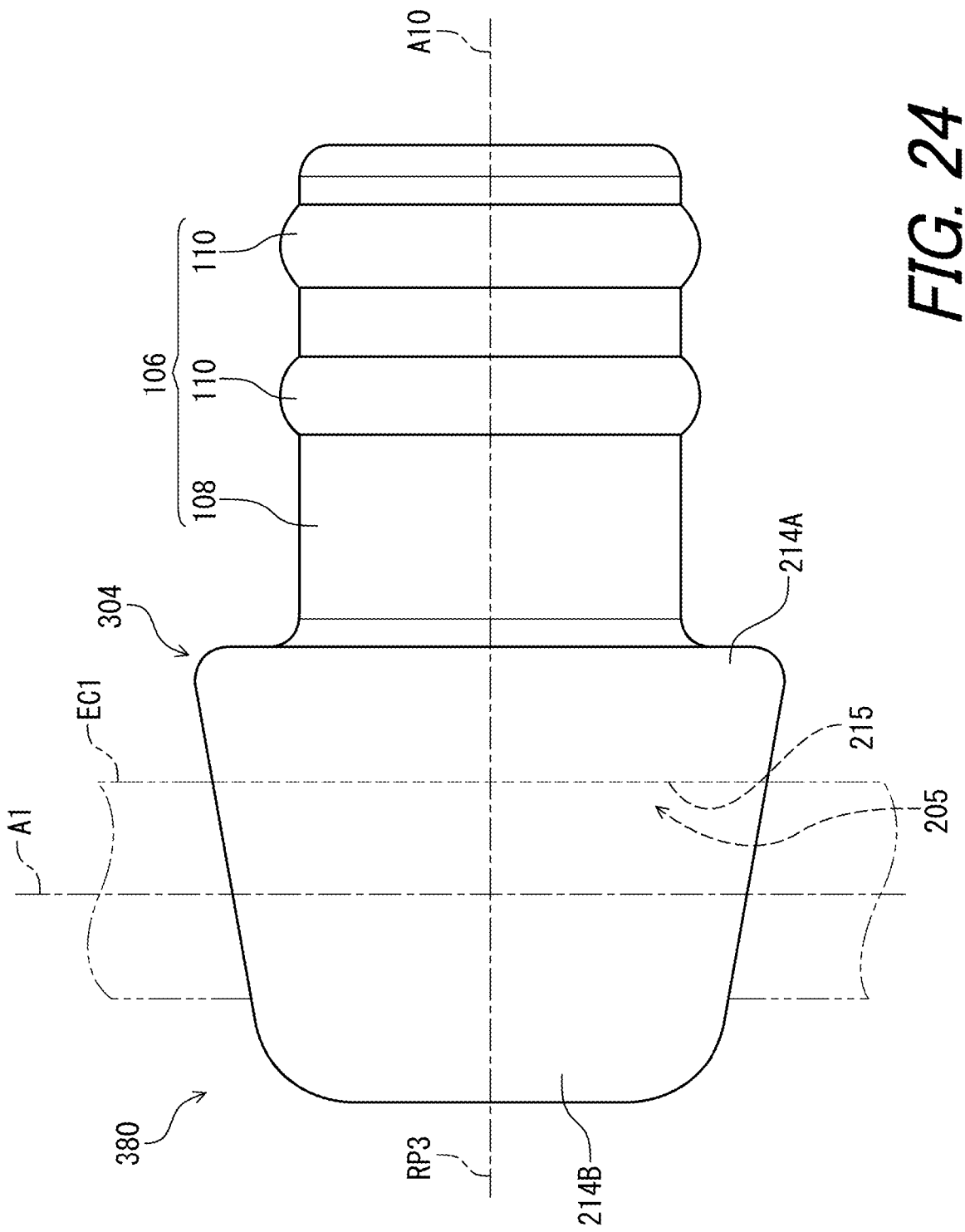
FIG. 24 is a top view of the cable holder of the bicycle derailleur illustrated in FIG. 21.
Figure 25:
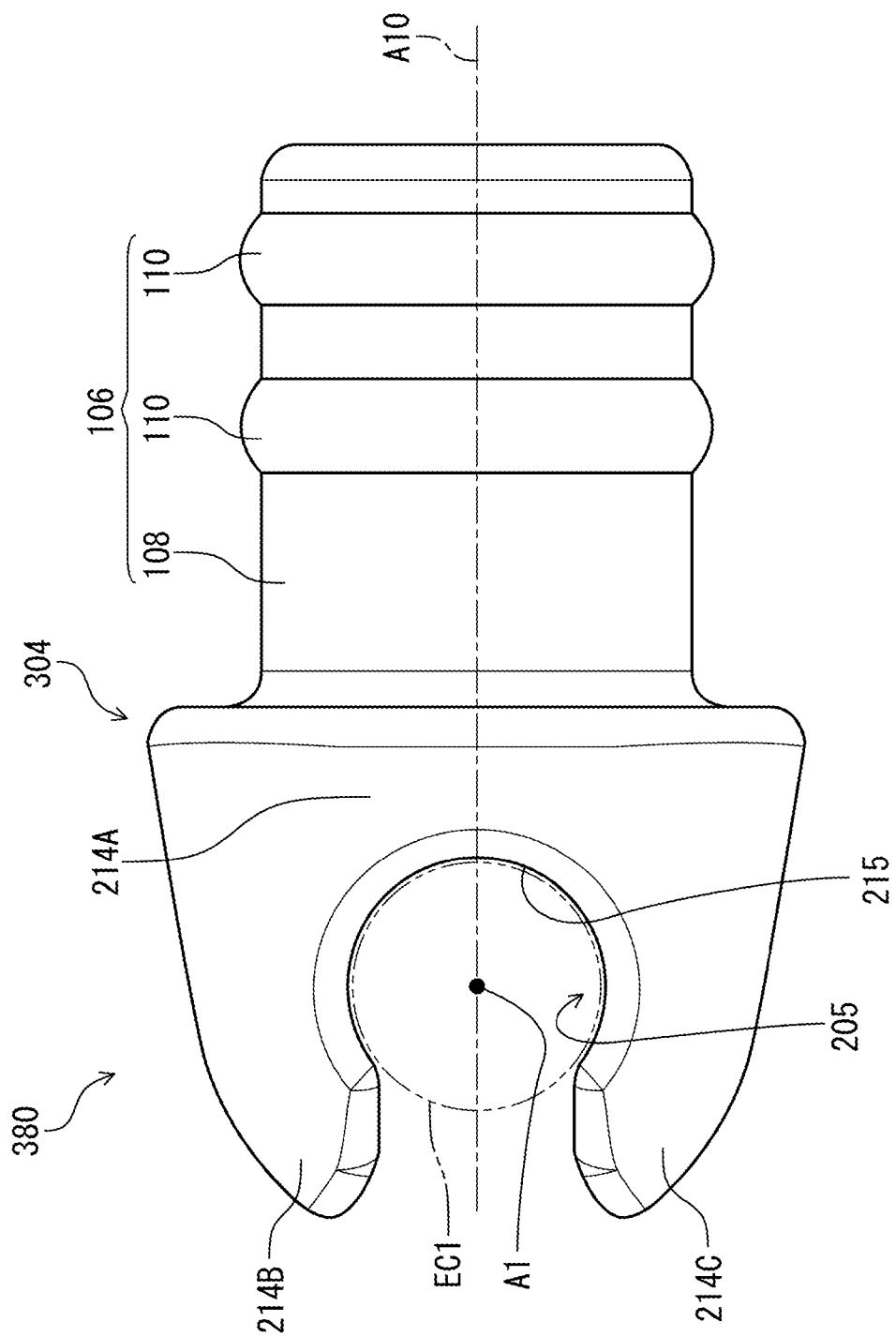
FIG. 25 is a side elevational view of the cable holder of the bicycle derailleur illustrated in FIG. 21.

As seen in FIGS. 23 to 25, the holder body 304 has substantially the same structure as the structure of the second holder body 214 of the cable holder 280 in the second embodiment. The holder body 304 includes the holder groove 205 in which the electric cable EC1 is to be provided. The holder body 304 includes the base part 214A, the first extending part 214B, and the second extending part 214C.

As seen in FIG. 21, the cable holder 380 is configured to be movably coupled to the derailleur body 11. The cable holder 380 is configured to be pivotally coupled to the derailleur body 11. The cable holder 380 is configured to be pivotally coupled to the derailleur body 11 about the pivot axis A6.

As seen in FIG. 24, the cable holder 380 has a symmetrical shape with respect to a reference plane RP3 including the longitudinal center axis A10. The reference plane RP2 is perpendicular to the first linkage axis A1 of the holder groove 205. However, the cable holder 380 can have an asymmetrical shape with respect to the reference plane RP3 if needed and/or desired.

Modifications

In the first and second embodiments, the cable holders 80 and 280 are configured to hold the electric cable EC1. However, each of the cable holders 80 and 280 can be configured to hold other cables such as a mechanical cable.

In the first and second embodiments, the cable holder 80 is configured to be attached to the base fastener 82 to hold the cable EC1. The cable holder 280 is configured to be attached to the base fastener 82 to hold the cable EC1.

However, each of the cable holder 80 and 280 can be configured to be attached to the base fastener 84 to hold the cable EC1. Furthermore, each of the cable holder 80 and 280 can be configured to be attached to a part of the derailleur body 11 other than the base fasteners 82 and 84 to hold the cable EC1.

Figure 26:
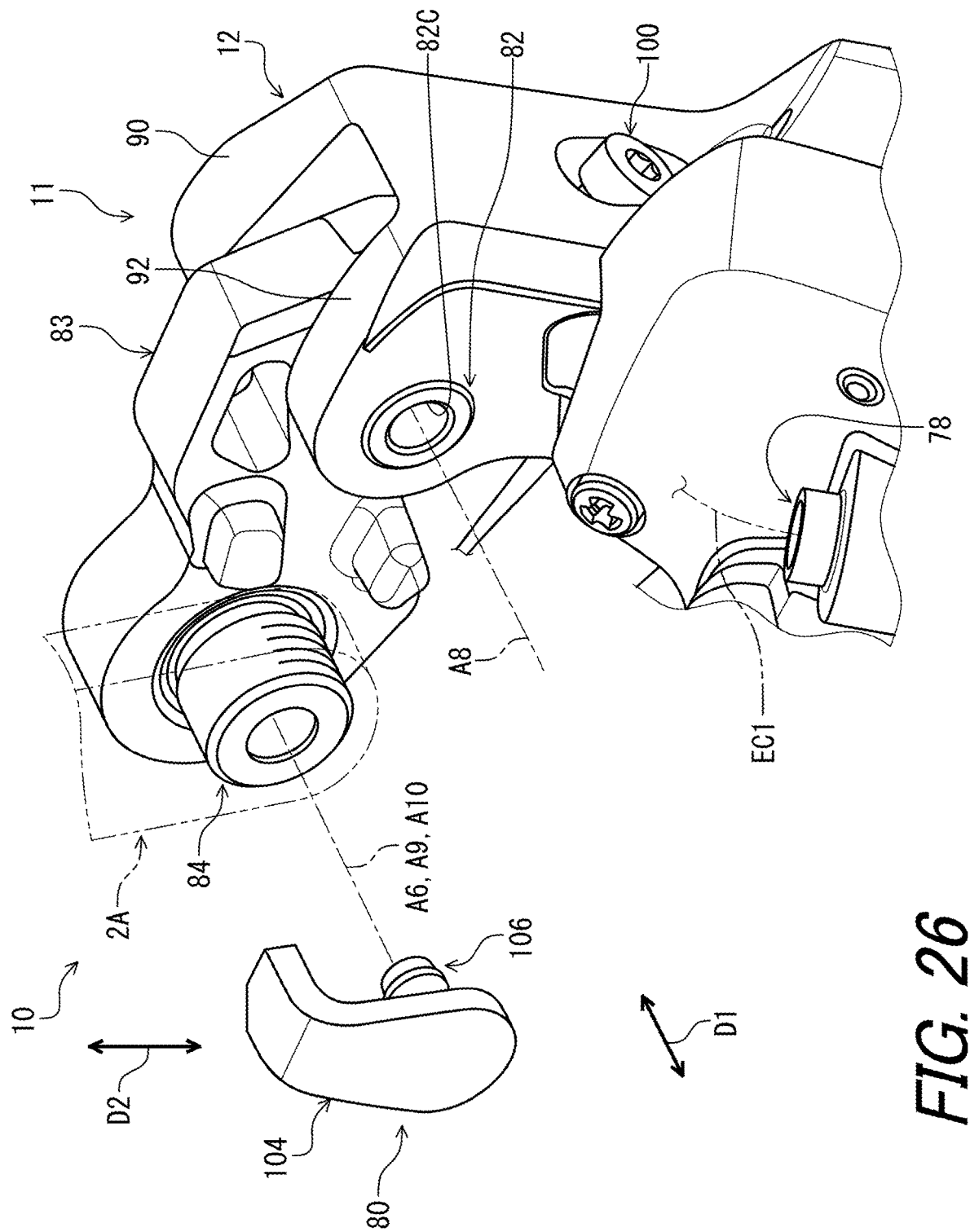
FIG. 26 is an exploded perspective view of the bicycle derailleur in accordance with a modification.
Figure 27:
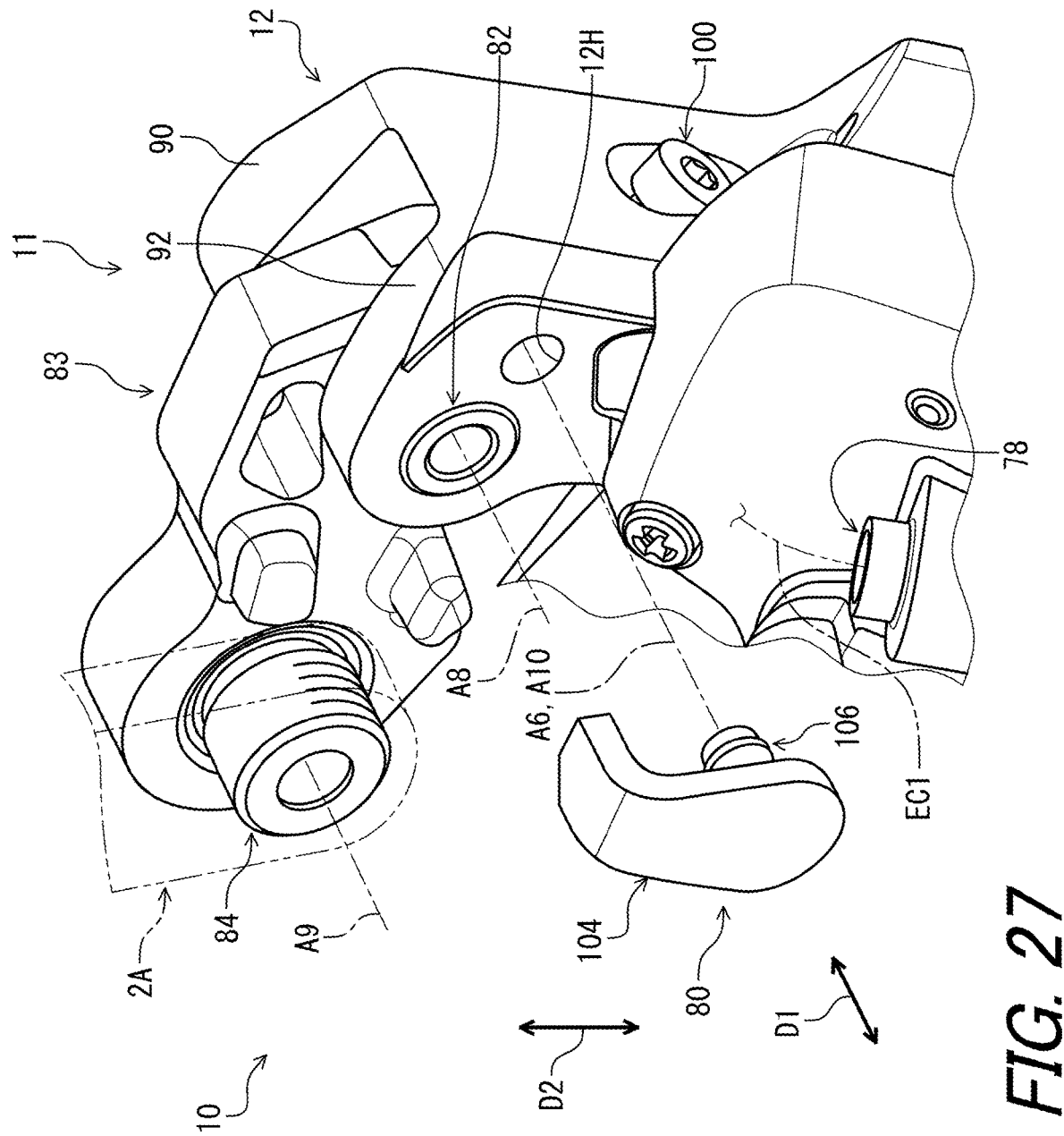
FIG. 27 is an exploded perspective view of the bicycle derailleur in accordance with a modification.

In the first and second embodiments, the cable holder 80 or 280 is configured to be attached to the base fastener 82 to hold the cable EC1. As seen in FIG. 26, however the cable holder 80 can be configured to be attached to the base fastener 84 to hold the cable EC1. The base fastener 84 is configured to fasten the bracket 83 to the bicycle frame 2A. Similarly, the cable holder 280 can be configured to be attached to the base fastener 84 to hold the cable EC1. Furthermore, as seen in FIG. 27, the cable holder 80 can be configured to be attached to the base member 12 of the derailleur body 11 without attaching the base fastener 82 or 84. The attachment body 106 can be provided in a hole 12H of the base member 12.

In the first and second embodiments and the above modifications, the cable holder 80 or 280 is configured to be attached to the inward side S2. However, the cable holders 80 and 280 can be configured to be attached to the outward side S1 if needed and/or desired.

As seen in FIGS. 1 and 2, the bicycle 2 can include a grommet structure 410 configured to be attached to the bicycle frame 2A. The grommet structure 410 is configured to support the bicycle cable EC1 extending through a mounting hole of the bicycle frame 2A.

Figure 28:
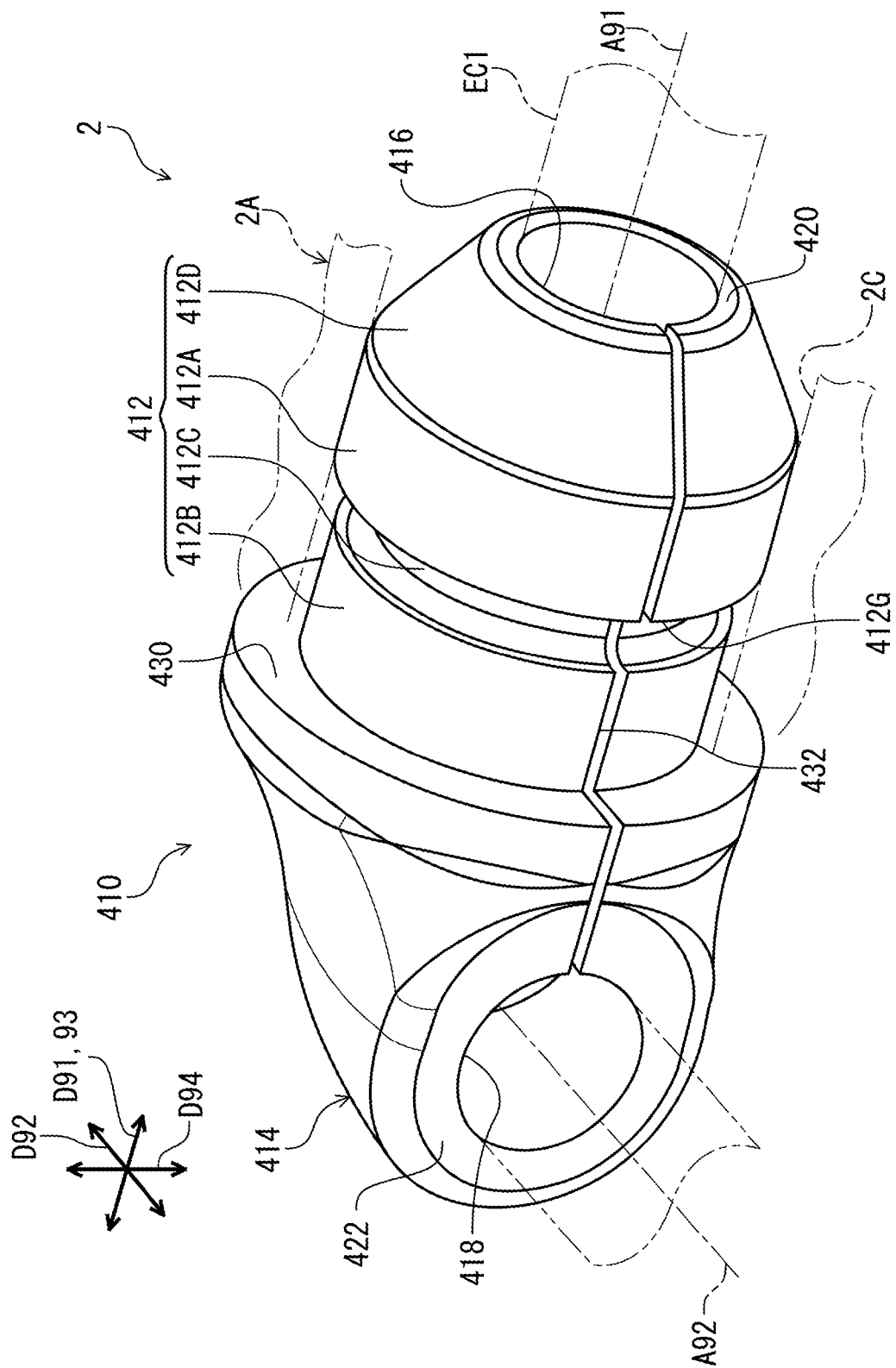
FIG. 28 is a perspective view of a grommet structure of the bicycle illustrated in FIG. 1.

As seen in FIG. 28, the grommet structure 410 for wiring the bicycle cable EC1 within the bicycle frame 2A comprises an inside portion 412 and an outside portion 414. The inside portion 412 is configured to be disposed within the bicycle frame 2A in a mounting state in which the grommet structure 410 is mounted to the bicycle frame 2A. The outside portion 414 is configured to be exposed from the bicycle frame 2A in the mounting state.

The inside portion 412 includes a first end opening 416 having a first center axis A91. The outside portion 414 includes a second end opening 418 having a second center axis A92. The cable EC1 extends through the first end opening 416 in an attachment state where the cable EC1 is attached to the bicycle frame 2A through the grommet structure 410. The cable EC1 extends through the second end opening 418 in the attachment state where the cable EC1 is attached to the bicycle frame 2A through the grommet structure 410.

The inside portion 412 includes a first end surface 420. The outside portion 414 includes a second end surface 422. The first end opening 416 is provided on the first end surface 420. The second end opening 418 is provided on the second end surface 422.

Figure 29:
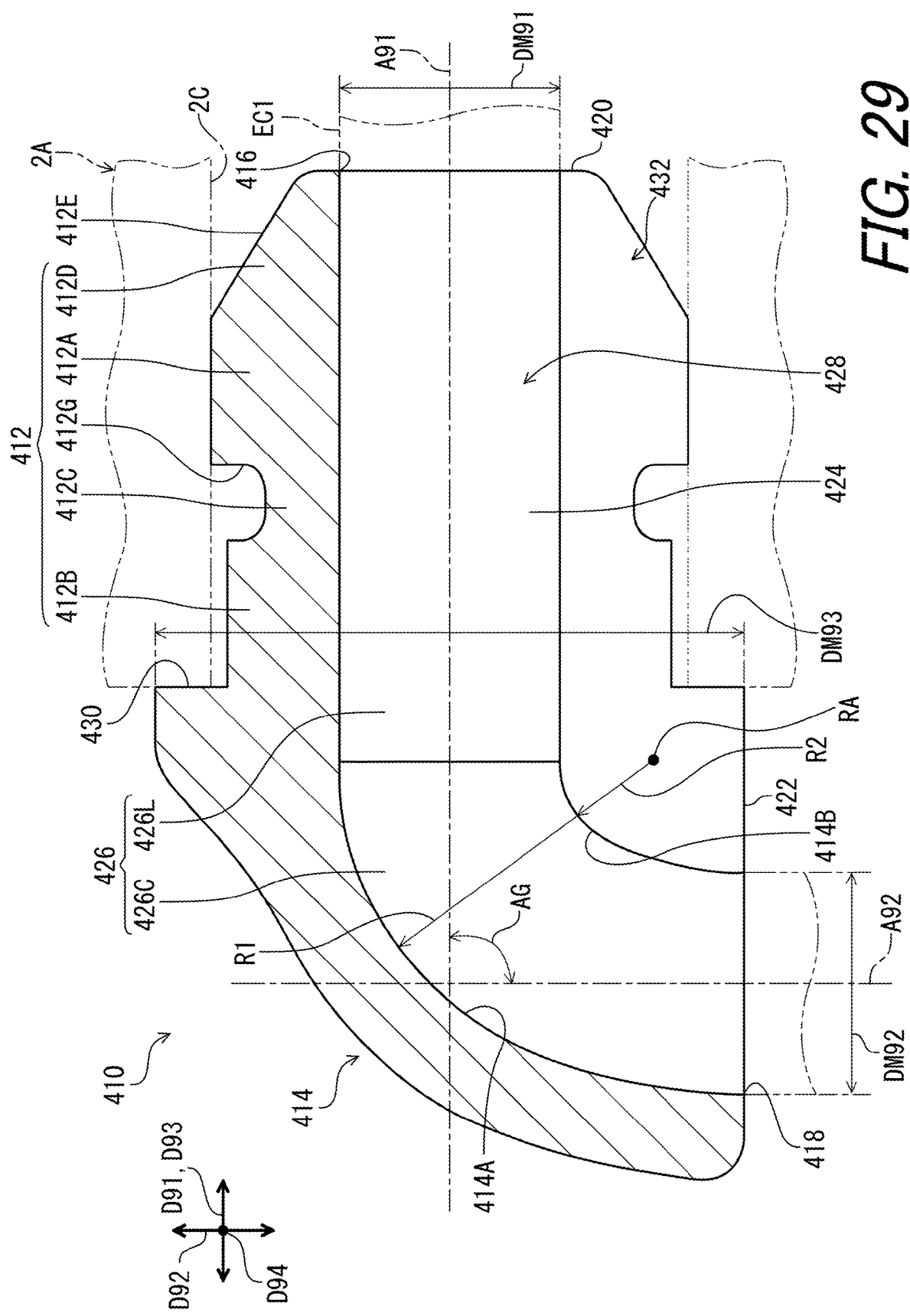
FIG. 29 is a cross-sectional view of the grommet structure along line XXIX-XXIX of FIG. 32.

As seen in FIG. 29, the first center axis A91 is perpendicular to the first end surface 420. The second center axis A92 is perpendicular to the second center axis A92. The first center axis A91 of the first end opening 416 is non-parallel to the second center axis A92 of the second end opening 418. The first center axis A91 intersects with the second center axis A92. An axis angle AG is defined between the first center axis A91 of the first end opening 416 and the second center axis A92 of the second end opening 418. The axis angle AG ranges from 1 degree to 90 degrees. In the present embodiment, the axis angle AG is 90 degrees. However, the axis angle AG is not limited to the above size and range.

The first end opening 416 faces in a first axial direction D91. The second end opening 418 faces in a second axial direction D92 that is different from the first axial direction D91. The first end surface 420 faces in the first axial direction D91. The second end surface 422 faces in the second axial direction D92. The first axial direction D91 is perpendicular to the second axial direction D92. The first axial direction D91 is defined to be parallel to the first center axis A91. The second axial direction D92 is defined to be parallel to the second center axis A92.

The first end opening 416 has a first inner diameter DM91. The second end opening 418 has a second inner diameter DM92. In the present embodiment, the first inner diameter DM91 is equal to the second inner diameter DM92. For example, the first inner diameter DM91 is 3 mm. The second inner diameter DM92 is 3 mm. However, the first inner diameter DM91 can be different from the second inner diameter DM92. The first inner diameter DM91 and the second inner diameter DM92 are not limited to the above sizes.

The inside portion 412 includes a first internal cavity 424 connected to the first end opening 416. The outside portion 414 includes a second internal cavity 426 connected to the second end opening 418. The first internal cavity 424 extends from the first end opening 416 toward the second internal cavity 426. The second internal cavity 426 extends from the second end opening 418 toward the first internal cavity 424. The first internal cavity 424 is in communication with the second internal cavity 426 to provide a cable passageway 428 through which the bicycle cable EC1 is to extend.

The second internal cavity 426 extends at least partly non-parallel to the first internal cavity 424. At least one of the first internal cavity 424 and the second internal cavity 426 includes a curved section. In the present embodiment, the second internal cavity 426 includes a curved section 426C and a linear section 426L. The curved section 426C is connected to the second end opening 418. The linear section 426L is connected to the first internal cavity 424. The first internal cavity 424 and the linear section 426L of the second internal cavity 426 extend along the first center axis A91. However, the first internal cavity 424 can include a curved section. One of the curved section 426C and the linear section 426L can be omitted from the second internal cavity 426.

The curved section 426C of the second internal cavity 426 has a first curvature radius R1 and a second curvature radius R2 that is smaller than the first curvature radius R1. The first curvature radius R1 is defined from a center RA to a first inner curved surface 414A of the outside portion 414. The second curvature radius R2 is defined from the center RA to a second inner curved surface 414B of the outside portion 414. The second inner curved surface 414B is provided radially inward of the first inner curved surface 414A.

The second curvature radius R2 ranges from 1 mm to 1.5 mm. In the present embodiment, the second curvature radius R2 is 1.3 mm. However, the second curvature radius R2 is not limited to the above size and range.

In the present embodiment, the inside portion 412 and the outside portion 414 are formed as a unitary, one-piece member. The inside portion 412 and the outside portion 414 are made of an elastic material such as rubber. However, the inside portion 412 can be a separate member from the outside portion 414 if needed and/or desired. The inside portion 412 can be made of a material different from a material of the outside portion 414.

The inside portion 412 is configured to be mounted to a mounting hole 2C of the bicycle frame 2A in a press-fitted manner. The outside portion 414 has an abutment surface 430 configured to abut against the bicycle frame 2A in the mounting state. The inside portion 412 extends from the abutment surface 430 along the first center axis A91. The abutment surface 430 has an outer diameter DM93. The outer diameter DM93 of the abutment surface 430 is 8 mm. However, the outer diameter DM93 of the abutment surface 430 is not limited to the above size.

Figure 30:
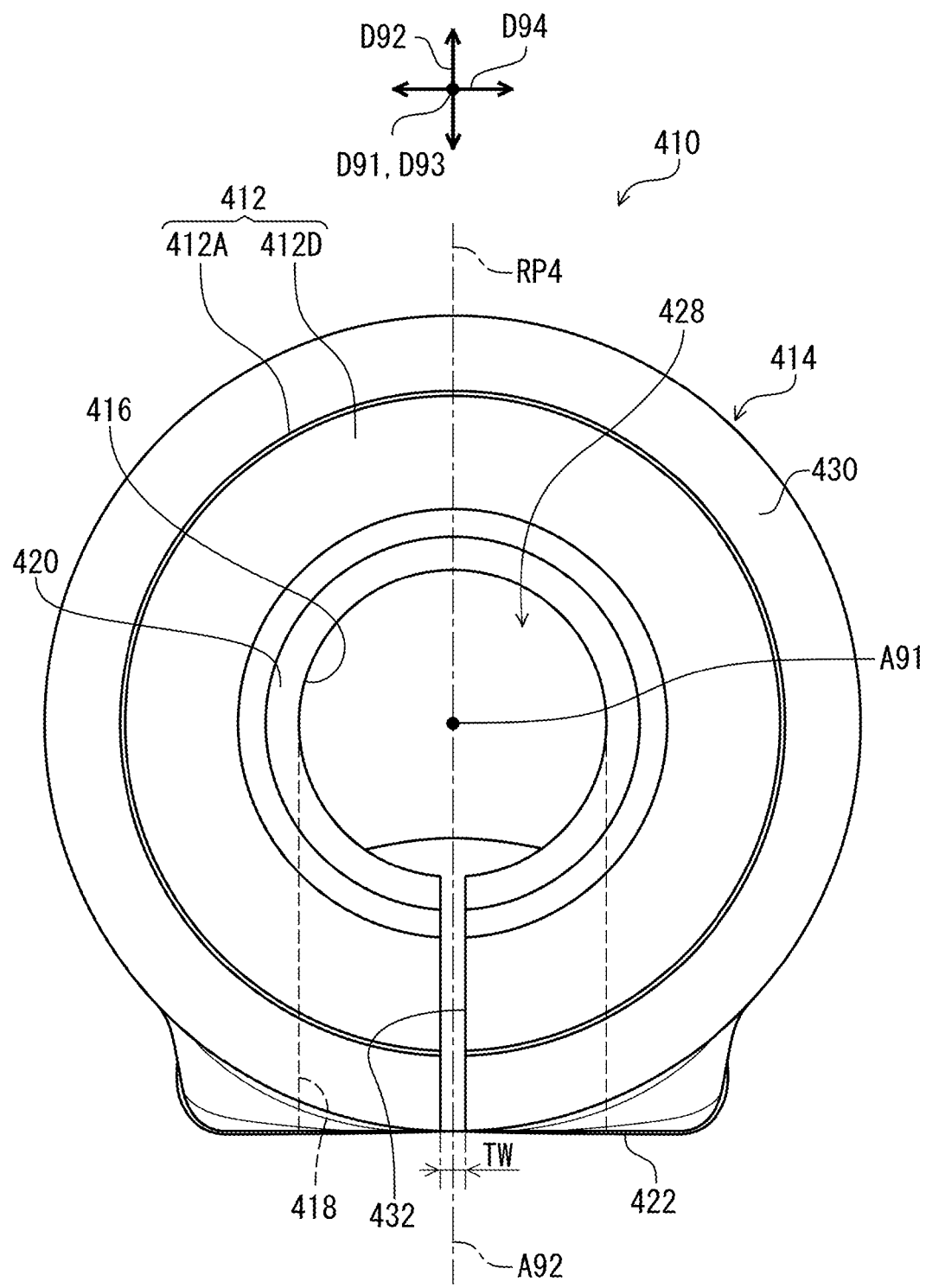
FIG. 30 is a front view of the grommet structure illustrated in FIG. 28.

As seen in FIG. 30, the abutment surface 430 circumferentially extends about the first center axis A91 of the first end opening 416. In the present embodiment, the abutment surface 430 has an annular shape. However, the shape of the abutment surface 430 is not limited to the annular shape.

Figure 31:
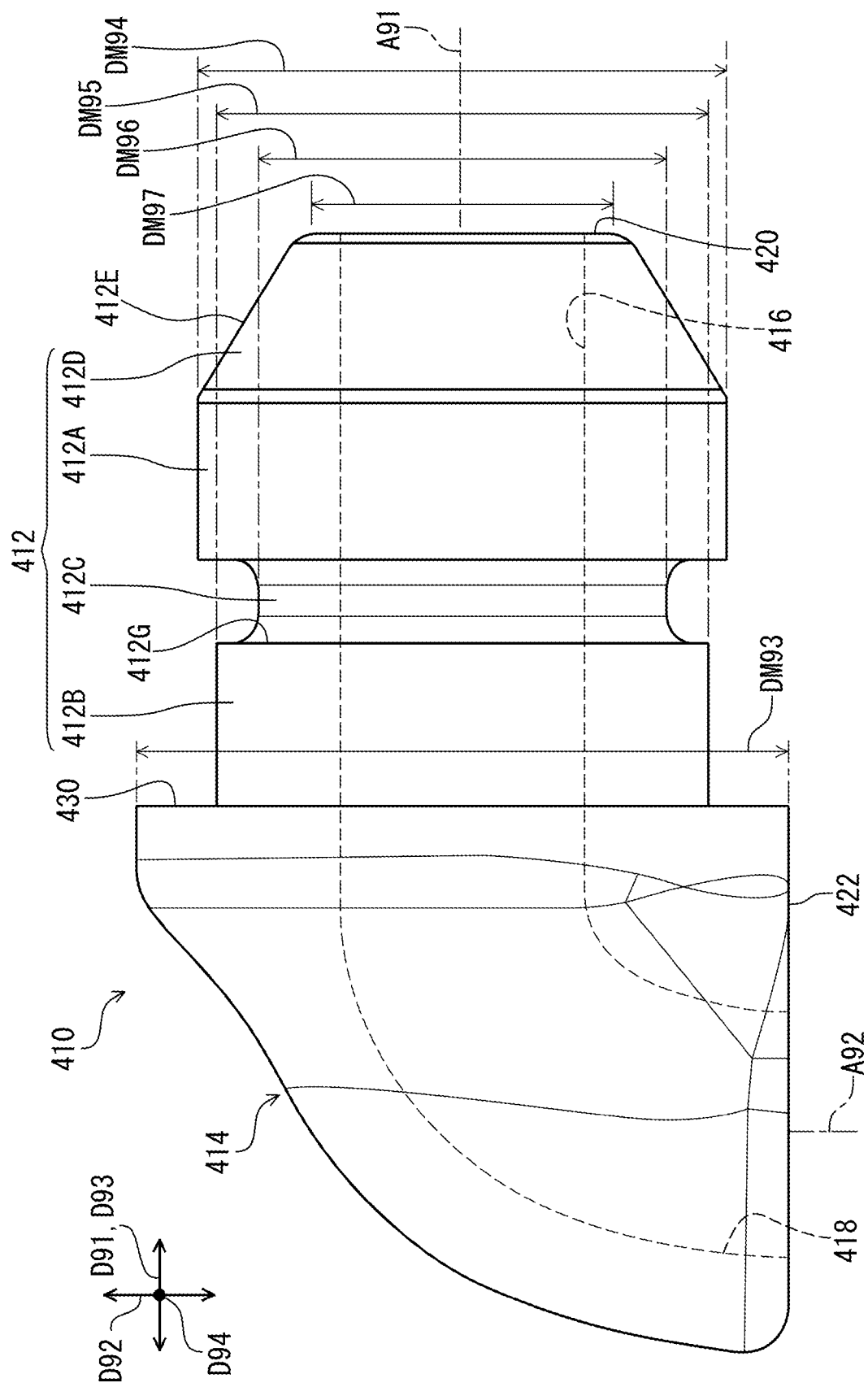
FIG. 31 is a side elevational view of the grommet structure illustrated in FIG. 28.

As seen in FIG. 31, the inside portion 412 includes a first large diameter section 412A, a second large diameter section 412B and a small diameter section 412C. The small diameter section 412C is disposed between the first large diameter section 412A and the second large diameter section 412B in an axial direction D93 with respect to the first center axis A91. The first large diameter section 412A is configured to be mounted to the mounting hole 2C of the bicycle frame 2A in a press-fitted manner. The second large diameter section 412B extends from the outside portion 414 in the axial direction D93. The second large diameter section 412B and the small diameter section 412C are provided between the first large diameter section 412A and the outside portion 414. The inside portion 412 includes a groove 412G. The first large diameter section 412A, the second large diameter section 412B and the small diameter section 412C define the groove 412G. However, the shape of the inside portion 412 is not limited to the above shape. The groove 412G can be omitted from the inside portion 412 if needed and/or desired. At least one of the second large diameter section 412B and the small diameter section 412C can be omitted from the inside portion 412 if needed and/or desired.

The first large diameter section 412A has a first large outer diameter DM94. The second large diameter section 412B has a second large outer diameter DM95. The small diameter section 412C has a small outer diameter DM96. In the present embodiment, the first large outer diameter DM94 is different from the second large outer diameter DM95 and the small outer diameter DM96. The first large outer diameter DM94 is larger than the second large outer diameter DM95 and the small outer diameter DM96. The second large outer diameter DM95 is different from the small outer diameter DM96. The second large outer diameter DM95 is larger than the small outer diameter DM96. The first large outer diameter DM94, the second large outer diameter DM95, and the small outer diameter DM96 are smaller than the outer diameter DM93 of the abutment surface 430 of the outside portion 414. For example, the first large outer diameter DM94 is 6.5 mm. The second large outer diameter DM95 is 6 mm. The small outer diameter DM96 is 5 mm. However, the first large outer diameter DM94, the second large outer diameter DM95, and the small outer diameter DM96 are not limited to the above sizes and the dimensional relationship. For example, the second large outer diameter DM95 can be equal to or larger than the first large outer diameter DM94.

The inside portion 412 includes an axially tapered section 412D with respect to the first center axis A91. The first large diameter section 412A is disposed between the axially tapered section 412D and the small diameter section 412C in the axial direction with respect to the first center axis A91. The axially tapered section 412D includes the first end opening 416. The first end surface 420 is provided on the axially tapered section 412D. The axially tapered section 412D includes a tapered surface 412E. The tapered surface 412E is inclined relative to the first center axis A91 to reduce a diameter of the tapered surface 412E from the first large diameter section 412A to the first end surface 420.

The axially tapered section 412D has a minimum diameter DM97 that is smaller than a diameter of the small diameter section 412C. The minimum diameter DM97 of the axially tapered section 412D is smaller than the small outer diameter DM96 of the smaller diameter section. For example, the minimum diameter DM97 is 4 mm. However, the minimum diameter DM97 of the axially tapered section 412D can be equal to or larger than the small outer diameter DM96 of the smaller diameter section. The minimum diameter DM97 is not limited to the above size.

Figure 32:
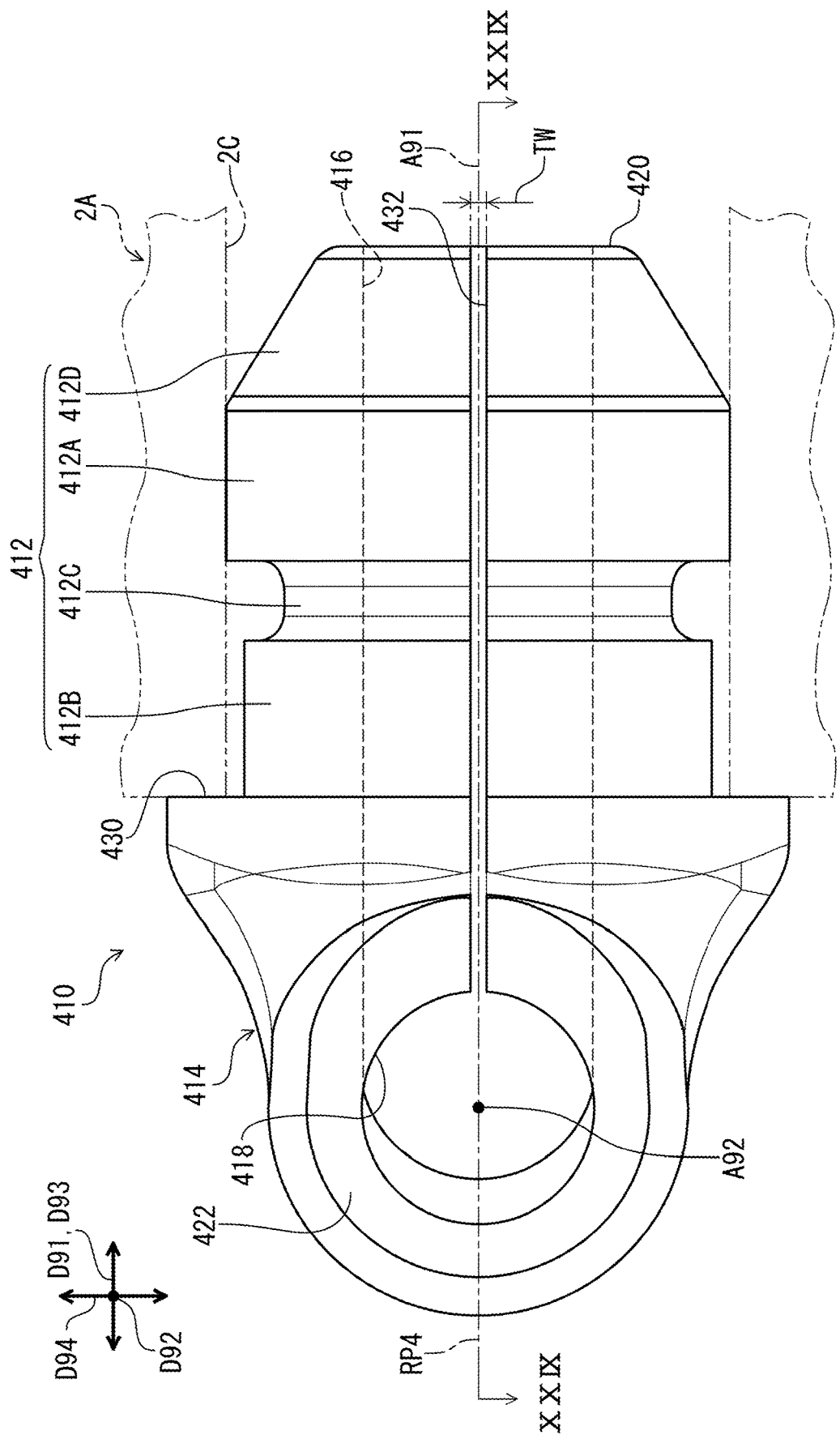
FIG. 32 is a bottom view of the grommet structure illustrated in FIG. 28.

As seen in FIG. 32, the grommet structure 410 comprises a slit 432. The slit 432 is formed from the first end opening 416 to the second end opening 418. The slit 432 extends from the first end opening 416 to the second end opening 418. The slit 432 is connected to each of the first end opening 416 and the second end opening 418. The slit 432 is configured to make at least one of the inside portion 412 and the outside portion 414 elastically deformable such that an outer diameter of at least one of the inside portion 412 and the outside portion 414 is reduced.

In the present embodiment, the slit 432 has a transverse width TW. The transverse width TW is defined in a direction D94 perpendicular to a reference plane RP4 defined by the first center axis A91 and the second center axis A92. The reference plane RP4 includes the first center axis A91 and the second center axis A92. The transverse width TW ranges from 0.1 mm to 0.3 mm. The transverse width TW is 0.2 mm. However, the transverse width TW is not limited to the above size and range.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1)

A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
   a derailleur body configured to be attached to a bicycle frame, the derailleur body including a housing and an electric port on the housing; and
   a cable holder configured to hold an electric cable and configured to be detachably attached to the derailleur body, the cable holder being separate from the housing.

2. The bicycle derailleur according to claim 1, wherein
   the derailleur body including an outward side and an inward side provided on a reverse side of the outward side,
   the inward side is provided closer to a transverse center plane of the bicycle frame than the outward side in a mounting state where the derailleur body is mounted to the bicycle frame, and
   the cable holder is configured to be attached to the inward side.

3. The bicycle derailleur according to claim 1, wherein
   the cable holder is configured to restrict the electric cable from moving relative to the derailleur body in a first direction defined along the longitudinal axis of the base fastener.

4. The bicycle derailleur according to claim 3, wherein
   the cable holder is configured to restrict the electric cable from moving relative to the derailleur body in a second direction different from the first direction.

5. A bicycle derailleur comprising:
   a derailleur body configured to be attached to a bicycle frame; and
   a cable holder configured to hold an electric cable and configured to be detachably attached to the derailleur body, wherein
   the derailleur body includes a base member and a base fastener configured to be attached to the base member,
   the base fastener includes a longitudinal axis, a first end, and a second end,
   the base fastener extends between the first end and the second end along the longitudinal axis,
   the second end of the base fastener is provided closer to a transverse center plane of the bicycle frame than the first end of the base fastener in a mounting state where the derailleur body is mounted to the bicycle frame, and
   the cable holder is configured to be attached to the second end of the base fastener.

6. The bicycle derailleur according to claim 5, wherein
   the base fastener includes an attachment hole provided at the second end of the base fastener, and
   the cable holder is configured to be at least partly provided in the attachment hole.

7. The bicycle derailleur according to claim 6, wherein
   the cable holder includes
   a holder body configured to be contactable with the electric cable, and
   an attachment protrusion extending from the holder body, and
   the attachment protrusion is configured to be at least partly provided in the attachment hole.

8. The bicycle derailleur according to claim 6, wherein
   the base fastener includes a tool engagement hole provided at the first end to be engaged with a tool.

9. The bicycle derailleur according to claim 8, wherein
   the attachment hole is connected to the tool engagement hole.

10. The bicycle derailleur according to claim 7, wherein
    the holder body is configured to hold the electric cable between the holder body and the base member.

11. The bicycle derailleur according to claim 7, wherein
    the holder body includes
    a first holder body coupled to the attachment protrusion, and
    a second holder body extending from the first holder body, the second holder body being spaced apart from the attachment protrusion.

12. The bicycle derailleur according to claim 11, wherein
    the first holder body includes a first support surface,
    the attachment protrusion extends from the first support surface, and
    the second holder body includes a second support surface configured to face toward the attachment protrusion.

13. The bicycle derailleur according to claim 12, wherein
    the second support surface is configured to face toward the base member in an attachment state where the cable holder is attached to the base fastener and the base fastener is attached to the base member.

14. The bicycle derailleur according to claim 7, wherein
    the holder body includes a holder groove in which the electric cable is to be provided.

15. The bicycle derailleur according to claim 14, wherein
    the holder body includes
    a first holder body coupled to the attachment protrusion, and
    a second holder body extending from the first holder body, the second holder body being spaced apart from the attachment protrusion, and
    the second holder body includes the holder groove.

16. The bicycle derailleur according to claim 14, wherein
    the holder groove extends in a direction which is non-parallel to the longitudinal axis of the base fastener in an attachment state where the cable holder is attached to the base fastener and the base fastener is attached to the base member.

17. The bicycle derailleur according to claim 5, wherein
    the base fastener is configured to fasten the base member to the bicycle frame.

18. The bicycle derailleur according to claim 5, wherein
    the derailleur body includes a bracket configured to be secured to the bicycle frame, and
    the base fastener is configured to fasten the base member to the bracket.

19. The bicycle derailleur according to claim 5, wherein
    the derailleur body includes a bracket configured to be secured to the bicycle frame, and
    the base fastener is configured to fasten the bracket to the bicycle frame.

20. The bicycle derailleur according to claim 5, wherein the base fastener includes
   a fastener head including the first end, and
   a fastener rod extending from the fastener head to the second end and including an external thread.

21. A bicycle derailleur comprising:
a derailleur body including a base member and a base fastener configured to be attached to the base member; and
a cable holder configured to be directly attached to the base fastener to hold a cable.

22. The bicycle derailleur according to claim 21, wherein
the base fastener includes a longitudinal axis, a first end, and a second end,
the base fastener extends between the first end and the second end along the longitudinal axis,
the second end of the base fastener is provided closer to a transverse center plane of a bicycle frame than the first end of the base fastener in the mounting state where the derailleur body is mounted to the bicycle frame, and
the cable holder is configured to be attached to at least one of the first end and the second end of the base fastener to hold the cable.

23. A bicycle derailleur comprising:
   a derailleur body configured to be attached to a bicycle frame; and
   a cable holder configured to hold an electric cable and configured to be movably coupled to the derailleur body.

24. A bicycle derailleur comprising:
   a derailleur body configured to be attached to a bicycle frame; and
   a cable holder configured to hold an electric cable and configured to be pivotally coupled to the derailleur body.

25. An electric cable holder for a bicycle derailleur, the electric cable holder comprising:
   a holder body configured to be contactable with an electric cable, and
   an attachment body configured to be attached to the bicycle derailleur.

26. A bicycle derailleur comprising:
   a derailleur body configured to be attached to a bicycle frame; and
   a cable holder configured to hold an electric cable and configured to be detachably attached to an attachment hole of the derailleur body.

* * * * *